(12) United States Patent
Bardsley

(10) Patent No.: US 8,214,445 B2
(45) Date of Patent: Jul. 3, 2012

(54) METHODS, SYSTEMS, AND COMPUTER PROGRAM PRODUCTS FOR MANAGING ELECTRONIC SUBSCRIPTIONS

(75) Inventor: Jeffrey S. Bardsley, Durham, NC (US)

(73) Assignee: Scenera Technologies,LLC, Portsmouth, NH (US)

( * ) Notice: Subject to any disclaimer, the term of this patent is extended or adjusted under 35 U.S.C. 154(b) by 0 days.

(21) Appl. No.: 13/152,930

(22) Filed: Jun. 3, 2011

(65) Prior Publication Data

US 2012/0005289 A1 Jan. 5, 2012

Related U.S. Application Data

(60) Continuation of application No. 12/896,952, filed on Oct. 4, 2010, now Pat. No. 7,979,545, which is a division of application No. 11/497,819, filed on Aug. 2, 2006, now Pat. No. 7,831,707.

(51) Int. Cl.
*G06F 15/16* (2006.01)
(52) U.S. Cl. ....................................... 709/206
(58) Field of Classification Search ................... 709/206
See application file for complete search history.

(56) References Cited

U.S. PATENT DOCUMENTS

| | | | |
|---|---|---|---|
| 5,813,007 A | 9/1998 | Nielsen | |
| 6,055,570 A | 4/2000 | Nielsen | |
| 6,484,197 B1 | 11/2002 | Donohue | |
| 7,224,778 B2 | 5/2007 | Aoki | |
| 7,415,504 B2 | 8/2008 | Schiavone et al. | |
| 7,831,707 B2 | 11/2010 | Bardsley | |
| 2003/0233413 A1 | 12/2003 | Becker | |
| 2004/0054733 A1 | 3/2004 | Weeks | |
| 2004/0139165 A1 | 7/2004 | McMillan et al. | |
| 2006/0010213 A1 | 1/2006 | Mehta | |
| 2006/0069587 A1* | 3/2006 | Banks et al. | 705/1 |

OTHER PUBLICATIONS

"1st Subscription Manager—More Info," [online] <URL: http://www.emailarms.com/products/1st_subscription.html> pp. 1-2 (Jun. 26, 2006).

Nick Bradbury, "Automatic Feed Unsubscribe," [online] <URL: http://nick.typepad.com/blog/2004/09/automatic_feed.html> pp. 1-3 (Sep. 16, 2004.

"Automatic Unsubscribe—The RSS Blog," [online] <URL: http://www.kbcafe.com/rss/?guid=20051013133541> pp. 1-3 (Oct. 13, 2005).

"Automatic Unsubscribe Considered Harmful," [online] <URL: http://laughingmeme.org/articles/2005/11/01/automatic-unsubscribe-considered-harmful> pp. 1-4 (Nov. 1, 2005).

"Automatic Unsubscribe for Feeds," [online] <URL: http://www.feedblog.org/2005/10/automatic_unsub.html> pp. 1-3 (Oct. 2005).

"Automatic Unsubscribe is Wrong," [online] <URL: http://philwilson.org/blog/2005/11/automatic-unsubscribe-is-wrong.html> pp. 1-3 (Nov. 1, 2003).

Nick Bradbury, "Feed Demon," [online] <URL: http://nick.typepad.com/blog/2005/10/feeddemon_16_au.html> pp. 1-2 (Oct. 11, 2005).

(Continued)

*Primary Examiner* — Jerry Dennison

(57) ABSTRACT

Managing electronic subscriptions includes receiving user input for modifying an electronic subscription of a user to prevent receiving a redundant subscription message for the electronic subscription. Whether a future subscription message is redundant is determined based on at least one of an identifier for the subscription message and content included in the subscription message. Redundant future subscription messages associated with the electronic subscription is excluded from presentation to the user based on the redundancy determination and the user input.

15 Claims, 21 Drawing Sheets

OTHER PUBLICATIONS

"Majordomo," [online] <URL: http://www.greatcircle.com/majordomo/> pp. 1-4 (Copyright 2006).

"Mass Personalized Email Marketing Software—Email Marketing Director," [online] <URL: http://www.arialsoftware.com/emailmarketingdirector.htm> pp. 1-4 (Copyright 2006).

"New Feature Introduction: Automatic Unsubscribe," [online] <URL: http://www.newsgator.com/forum/shwmessage.aspx?ForumID=24&MessageID=12907> pp. 1-2 (Feb. 8, 2006).

Nick Bradbury, "TopStyle/Feed Demon," [online] <URL: http://nick.typepad.com/blog/2005/10/feeddemon_16_au.html> pp. 1-2 (Oct. 13, 2005.

* cited by examiner

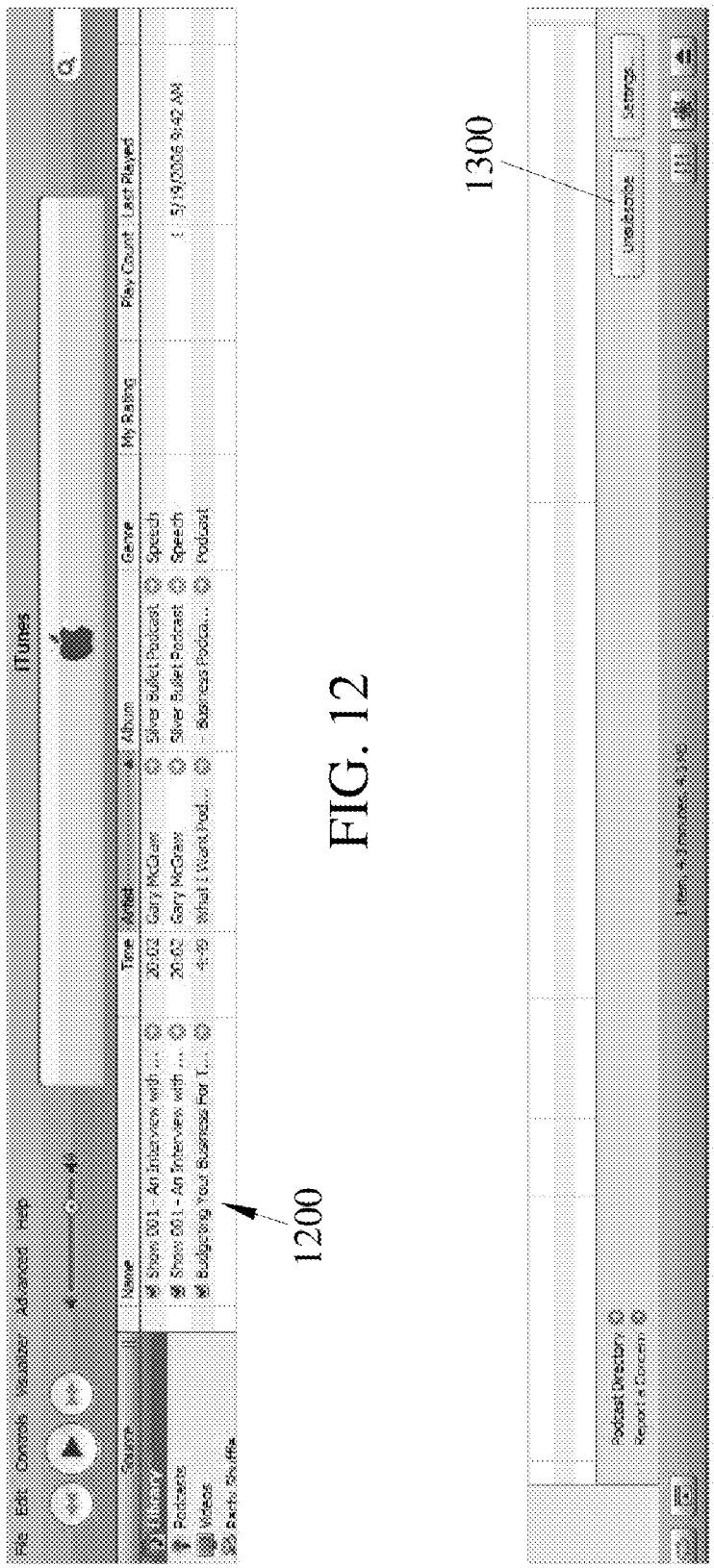

METHODS, SYSTEMS, AND COMPUTER PROGRAM PRODUCTS FOR MANAGING ELECTRONIC SUBSCRIPTIONS

RELATED APPLICATIONS

This application is a continuation of U.S. patent application Ser. No. 12/896,952, titled "Methods, Systems, And Computer Program Products For Managing Electronic Subscriptions," filed Oct. 4, 2010 now U.S. Pat. No. 7,979,545, which is a divisional of U.S. patent application Ser. No. 11/497,819, now U.S. Pat. No. 7,831,707, titled "Methods, Systems, And Computer Program Products For Managing Electronic Subscriptions," filed Aug. 2, 2006, and is related to U.S. patent application Ser. No. 12/896,956, titled "Methods, Systems, And Computer Program Products For Managing Electronic Subscriptions," filed Oct. 4, 2010, each of which is commonly owned with this application, the entire disclosure of each is incorporated by reference herein.

TECHNICAL FIELD

The subject matter described herein relates to electronic subscriptions. More particularly, the subject matter described herein relates to methods, systems, and computer program products for managing electronic subscriptions.

BACKGROUND

An electronic subscription is a service by which a user receives content of interest to the user, such as news, technical information, or sports information, via an electronic device. The electronic device subscribing to an electronic subscription may include an electronic subscription client for managing received subscription messages. The subscription messages may be provided by an electronic subscription message source. The electronic subscription message source may store information about a client, such as a client's name and address. Further, the electronic subscription message source may generate subscription messages containing information content, such as news and weather, and media content, such as music, television shows, and movies. Exemplary subscription messages include e-mail messages, real simple syndication (RSS) messages, and podcasts.

One problem with electronic subscriptions is that a user may receive many subscription messages that are never opened or read by the user. For example, the user may subscribe to more electronic content than the user has time to read. The user may delete the unread or unopened subscription messages. Alternatively, the user may allow the unread or unopened subscription message to be stored on an electronic device. Thus, over time, unread or unopened subscription messages can consume a significant portion of the memory of electronic device. Further, when a significant amount of the subscription messages are acquired, the subscription messages can result in a disorganized user interface with the electronic device. It would be beneficial to provide for the management of electronic subscriptions to reduce the receipt and storage of messages that are not opened, read, or otherwise used by a user.

Further, when a user is subscribed to several electronic subscription services, subscription messages received from the electronic subscriptions may contain redundant content. As a result, a user may access subscription messages having the same content or substantially similar content. The user may either read the redundant or cumulative content twice or may ignore the redundant or cumulative content. Either result is undesirable. Accordingly, it would be beneficial to provide for management of electronic subscriptions that addresses redundant or cumulative content.

Another problem associated with electronic subscriptions occurs when a user subscribes to a subscription that the user has previously canceled. At the time of the second subscription, the user may not remember that he has previously canceled the original subscription, for example, because the user learned that the content was not interesting. If the user is allowed, without notification, to subscribe to the uninteresting content the second time, the user may receive the uninteresting content, later learn that the content is not interesting, and then may be required to cancel the subscription again. This process is inefficient from the standpoint of the user and utilization of the electronic device used to receive the electronic content. It would be beneficial to provide for management of electronic subscriptions that addresses these problems associated with previously canceled subscriptions.

Accordingly, in light of the above described difficulties and needs associated with electronic subscriptions, there exists a need for improved methods, systems, and computer program products for managing electronic subscriptions.

SUMMARY

According to one aspect, the subject matter described herein includes methods, systems, and computer program products for managing electronic subscriptions. Managing electronic subscriptions includes receiving user input for modifying an electronic subscription of a user to prevent receiving a redundant subscription message for the electronic subscription. Whether a future subscription message is redundant is determined based on at least one of an identifier for the subscription message and content included in the subscription message. Redundant future subscription messages associated with the electronic subscription is excluded from presentation to the user based on the redundancy determination and the user input.

As used herein, the term "electronic subscription" refers to a service in which an electronic content source provides content to a subscriber via an electronic device. For example, a content source may be an organization such as the Wall Street Journal or Security Focus. In this example, the organization may communicate e-mail subscription messages to the subscriber's computer or mobile phone over the Internet. Exemplary content delivered via an electronic subscription may include newsletter e-mails, music files, pictures, daily horoscopes, weather, daily jokes, ring tones, television shows, movies, or any other digital media or data that may be delivered electronically to a device.

As used herein, the term "electronic subscription client" refers to functionality for receiving and accessing subscription content. An electronic subscription client may reside on an electronic device, such as a mobile phone, a laptop computer, a desktop computer, a mobile game player, a music player, or any combination thereof. Exemplary electronic subscription clients include an e-mail client (e.g., MICROSOFT OUTLOOK®, EUDORA®, and LOTUS NOTES®), a web-based e-mail client (e.g., YAHOO!® mail, GOOGLE GMAIL®, and EARTHLINK® mail), a real simple syndication (RSS) reader (e.g., NEWSGATOR™ aggregator and RSS READER™), an RSS aggregator (e.g., FEEDDEMON™ RSS aggregator and NEWZIE™ RSS aggregator), a media player (e.g., RHAPSODY®, ITUNES®, and WINDOWS MEDIAPLAYER®), a photoshare client (e.g., FLICKR™ photoshare and SNAPFISH® photoshare), and a personalized web page (e.g., MYYA- HOO!® web service, GOOGLE® Homepage, MYSPACE.COM® web service, and FACEBOOK™ web service).

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 12 is a computer screenshot of a window including a list of electronic subscriptions according to an embodiment of the subject matter described herein;

FIG. 13 is a computer screenshot of a window including an unsubscribe button that may be selected for unsubscribing to a corresponding electronic subscription according to an embodiment of the subject matter described herein;

DETAILED DESCRIPTION

Figure 1:
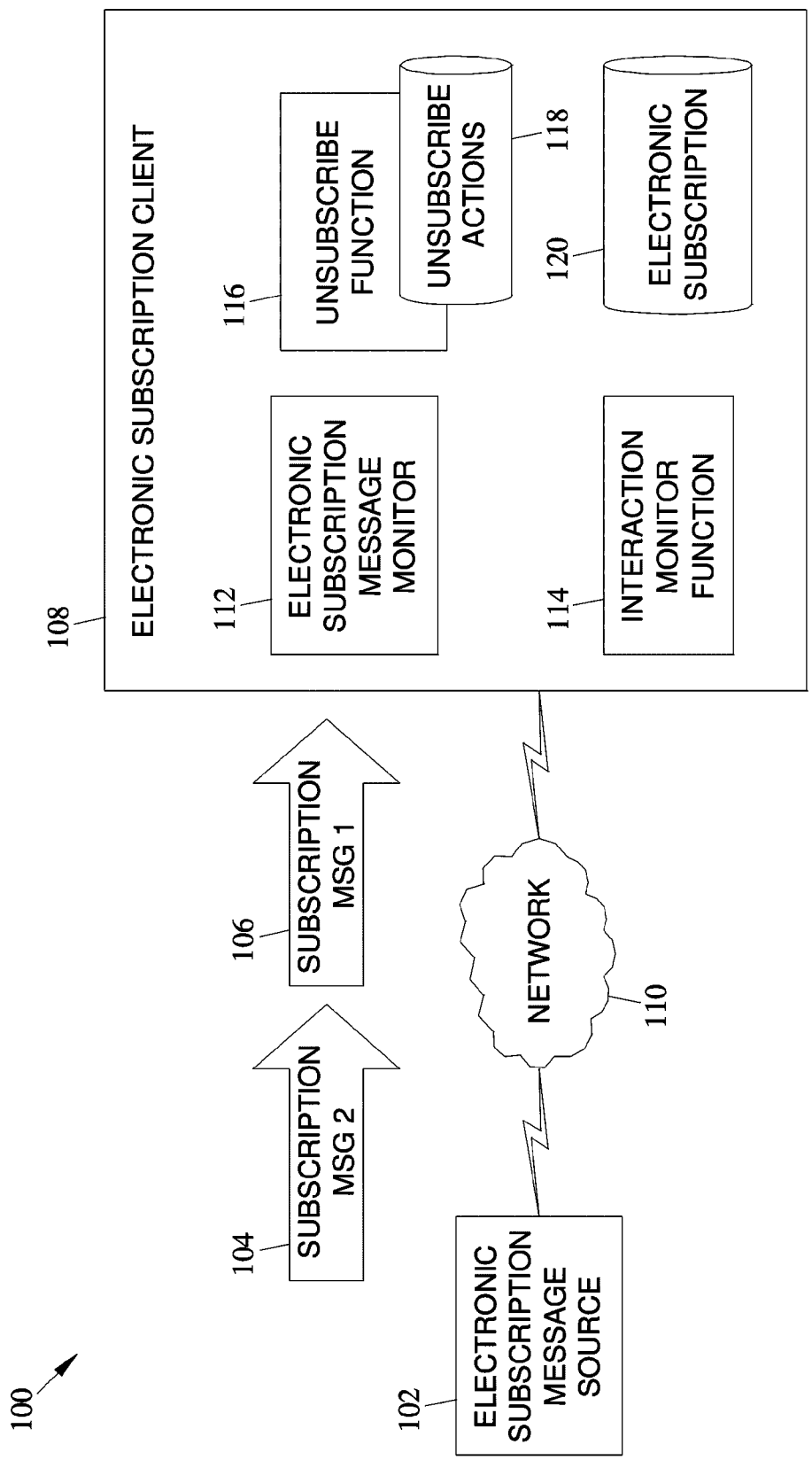
FIG. 1 is a block diagram of an exemplary system for managing electronic subscriptions according to the subject matter described herein.

The subject matter described herein includes methods, systems, and computer program products for managing electronic subscriptions. According to one aspect, a system according to the subject matter described herein may be implemented as hardware, software, and/or firmware components executing on one or more components of a system configured to manage and/or receive subscription messages associated with an electronic subscription. FIG. 1 is a block diagram of an exemplary system 100 for managing electronic subscriptions according to the subject matter described herein. An electronic subscription message source 102 may be configured to generate subscription messages associated with one or more electronic subscriptions. Electronic subscription message source 102 may also communicate subscription messages that carry subscription content to electronic subscription clients associated with the electronic subscriptions. For example, electronic subscription message source 102 may communicate subscription messages 104 and 106 to an electronic subscription client 108 via a network 110. Electronic subscription client 108 may be subscribed to the electronic subscription and configured to receive subscription messages 104 and 106 via network 110.

Electronic subscription client 108 may include means for monitoring receipt of one or more subscription messages associated with an electronic subscription. For example, electronic subscription client 108 may include an electronic subscription message monitor 112 configured to monitor receipt of subscription messages associated with an electronic subscription. Electronic subscription client 108 may monitor receipt of subscription messages 104 and 106. Examples of subscription message monitoring include determining arrival of a subscription message, determining whether the subscription message is confirmation of a new subscription, determining subscription identification information in the subscription message, and determining information for unsubscribing to an electronic subscription.

Electronic subscription client 108 may include means for monitoring interaction with the electronic subscription client by a user to determine a viewing frequency of one or more received subscription messages. For example, electronic subscription client 108 may include an interaction monitor function 114 configured to monitor interaction with electronic subscription client 108 by a user to determine a viewing frequency of the received subscription messages. In one example, interaction monitor function 114 may determine a viewing frequency of received subscription messages associated with an electronic subscription. Interaction monitor function 114 may compare the determined viewing frequency of received subscription messages to a viewing frequency threshold. Further, in one example, interaction monitor function 114 may determine a number of received subscription messages and a number of received subscription messages acted upon by a user, and compare the numbers. Interaction monitor function 114 may provide the interaction monitoring information to an unsubscribe function 116.

Electronic subscription client 108 may include means for presenting, based on the determined viewing frequency, a prompt with a control configured for unsubscribing the user from receiving a future subscription message associated with the electronic subscription. For example, unsubscribe function 116 may be configured to present, based on a determined viewing frequency, a prompt with a control configured for unsubscribing the user from receiving future content associated with the electronic subscription. In one example, unsubscribe function 116 may be configured to present a prompt with a control based on interaction monitoring information provided by interaction monitor function 114. The control may be a graphical object that allows the user to automatically unsubscribe from a subscription. The information required to unsubscribe may be stored by unsubscribe function 116 at the time a subscription agreement is made or when the message confirming a subscription is received. Further, in one example, unsubscribe function 116 may be configured to present a prompt with a control based on comparison information from interaction monitor function 114 about the determined viewing frequency of received subscription messages to a viewing frequency threshold. Further, in another example, unsubscribe function 116 may be configured to present a prompt with a control based on comparison information from interaction monitor function 114 about a number of received subscription messages and a number of received subscription messages acted upon by a user.

A user of electronic subscription client 108 may select the prompt for operating the control to unsubscribe the user from receiving future subscription messages associated with the electronic subscription. The control can be configured to implement one or more unsubscribe actions stored in a database 118 in response to selection of the prompt. The unsubscribe actions can include commands and/or functionality for unsubscribing to an electronic subscription. Unsubscribe function 116 may be configured to unsubscribe a user from receiving future subscription messages associated with an electronic subscription in response to receiving an input responsive to a prompt with a control for unsubscribing the user from receiving future subscription messages associated with the electronic subscription. The unsubscribe actions taken by unsubscribe function 116 for unsubscribing to an electronic subscription may be in accordance with the subject matter described herein or any other suitable procedure known to those of skill in the art.

Electronic subscription client 108 may include an electronic subscription database 120 configured to store information associated with one or more electronic subscriptions. For example, electronic subscription database 120 may store instructions or process information for unsubscribing to one or more electronic subscriptions. In this example, a control for unsubscribing to an electronic subscription may access the instructions stored in database 120 for unsubscribing to an electronic subscription. The information associated with an electronic subscription may be associated with the electronic subscription by an electronic subscription identifier. Exemplary unsubscribe instructions include the following: communicating a request to an electronic subscription message source for unsubscribing; and sending a message to one of an address, a uniform resource identifier (URI), or a link for unsubscribing from an electronic subscription. Exemplary links include web links. Exemplary addresses include e-mail addresses.

Unsubscribe function 116 may be configured to determine instructions or process information for unsubscribing a user from receiving future subscription messages associated with an electronic subscription. For example, unsubscribe function 116 may identify unsubscribe information in a message carrying subscription content or confirming a subscription. In this example, a control or process in unsubscribe actions 118 can be configured to unsubscribe based on the identified unsubscribe information, and the unsubscribe information may be stored in database 120. In one example, unsubscribe function 116 may determine one of an address, a URI, and a link associated with the electronic subscription for use in unsubscribing. In this example, a control or process in unsubscribe actions 118 can be configured to unsubscribe based on the address, the URI, or the link, and the address, the URI, or the link may be stored in database 120. Further, in this example, the process for unsubscribing may include accessing a resource and sending a message using the address, the URI, or the link. In one example, unsubscribe function 116 may identify text in one or more subscription messages indicating information for unsubscribing. Examples of text associated with unsubscribing includes one or more of subscribe text, mailing list text, and unsubscribe text. In another example, unsubscribe function 116 may determine a URI in an RSS reading list associated with an electronic subscription and configure a control or process to remove the URI from the RSS reading list.

Figure 2:
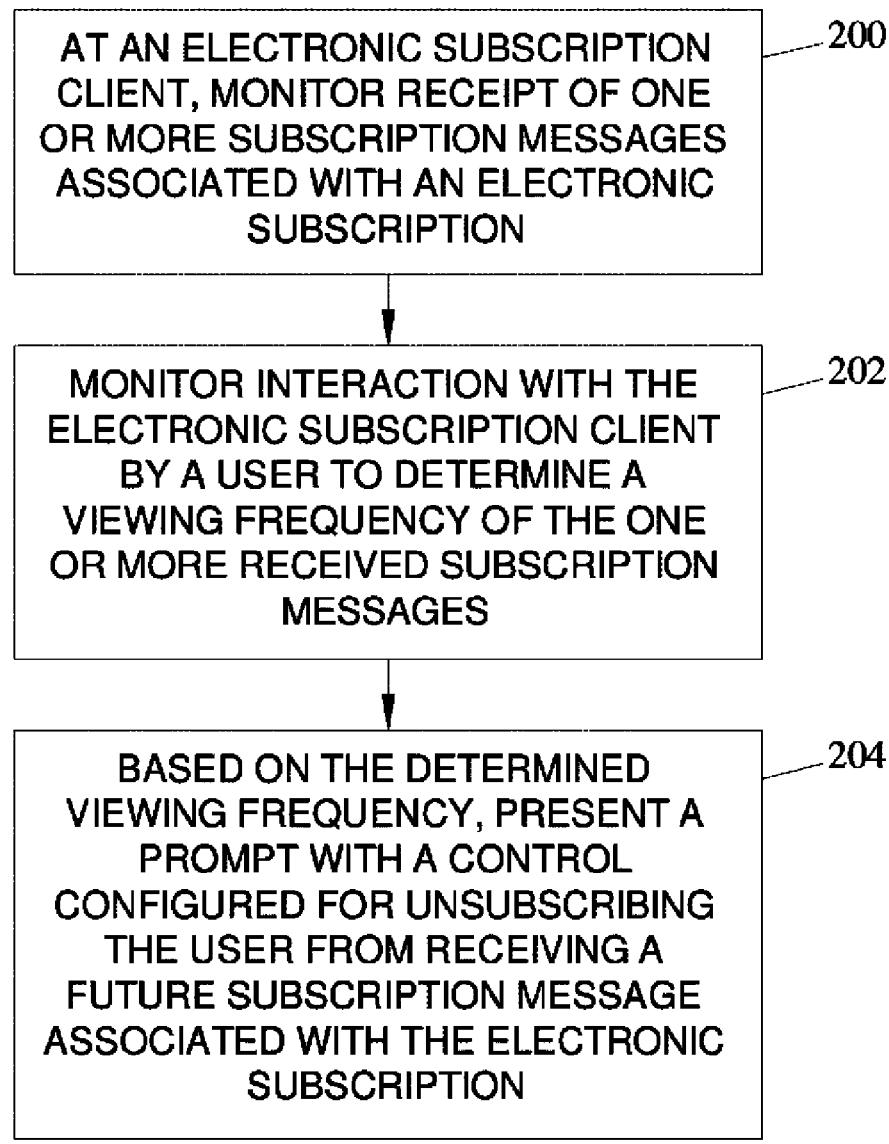
FIG. 2 is a flow chart of an exemplary process for managing electronic subscriptions according to an embodiment of the subject matter described herein.

FIG. 2 is a flow chart illustrating an exemplary process for managing electronic subscriptions according to an embodiment of the subject matter described herein. Referring to FIG. 2, in block 200 the process provides for monitoring, at an electronic subscription client, receipt of one or more subscription messages associated with an electronic subscription. For example, a process associated with system 100 may provide for electronic subscription message monitor 112 to monitor receipt of subscription messages 104 and 106 at electronic subscription client 108. In block 202, interaction with the electronic subscription client by a user may be monitored to determine a viewing frequency of the one or more received subscription messages. For example, interaction monitor function 114 may be configured to monitor interaction with electronic subscription client 108 by a user to determine a viewing frequency of one or more received subscription messages. A viewing frequency of the received one or more subscription messages may be determined using any of the techniques described above. In block 204, based on the determined viewing frequency, a prompt with a control configured for unsubscribing the user from receiving a future subscription message associated with the electronic subscription may be presented. For example, unsubscribe function 116 may present a prompt with a control configured to unsubscribe the user from receiving a future subscription message associated with the electronic subscription. A user may select or otherwise activate the prompt for unsubscribing from receiving the future subscription message.

Figure 3A:
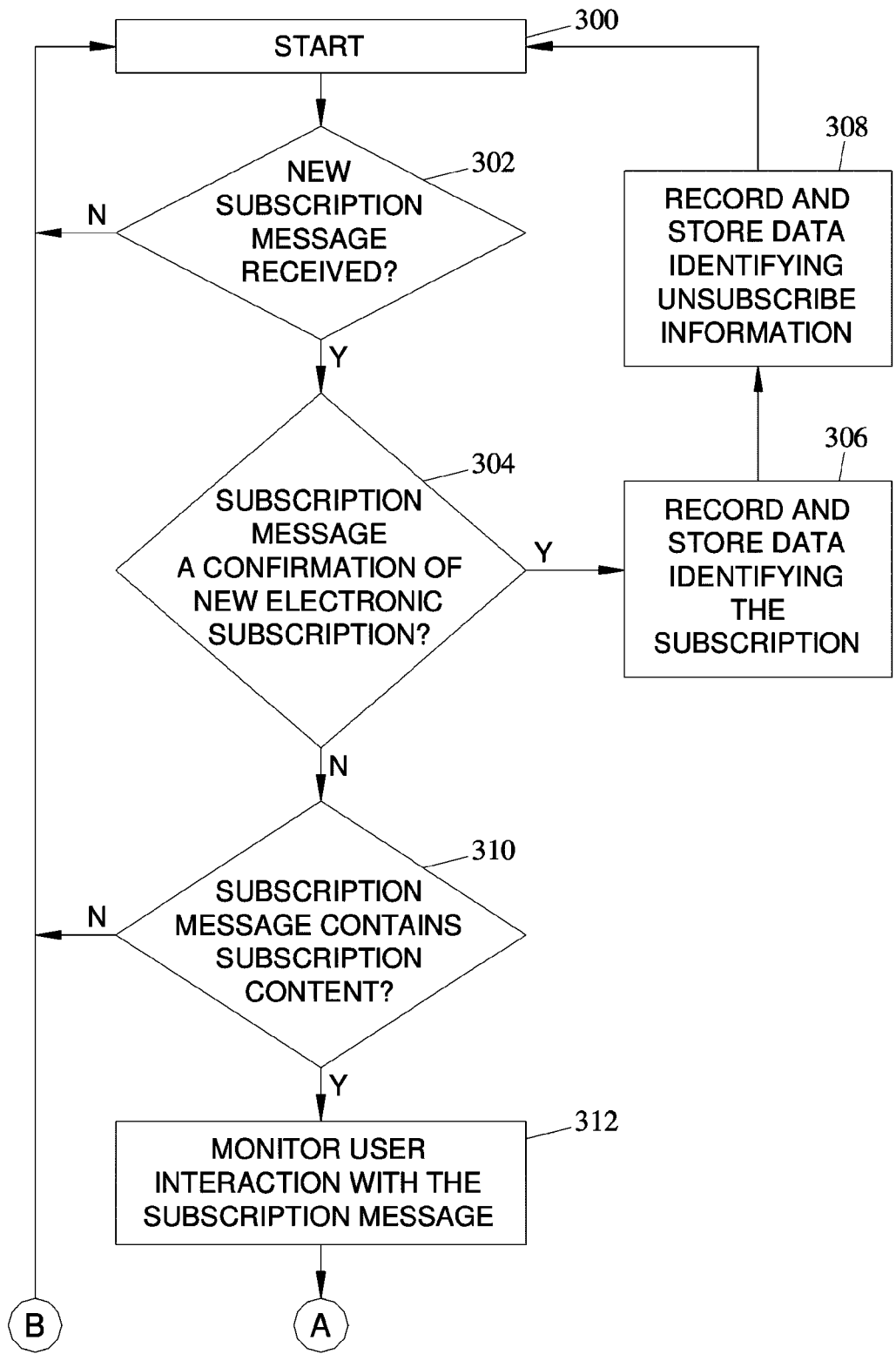
FIGS. 3A and 3B are a flow chart of an exemplary process for use by the system shown in FIG. 1 for managing electronic subscriptions according to an embodiment of the subject matter described herein.
Figure 3B:
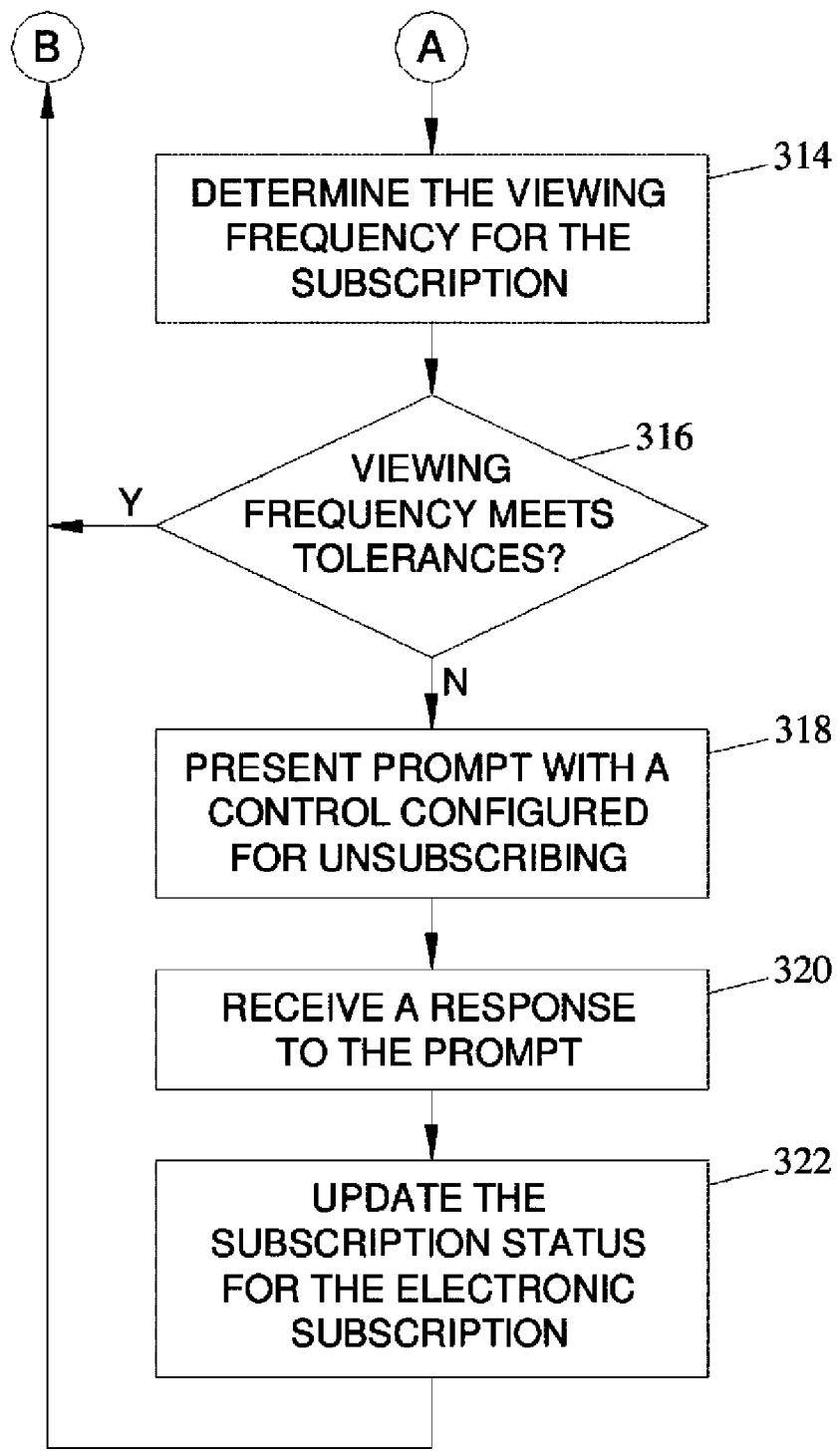

FIGS. 3A and 3B are a flow chart illustrating an exemplary process for use by system 100 shown in FIG. 1 for managing electronic subscriptions according to an embodiment of the subject matter described herein. FIGS. 3A and 3B illustrate in more detail the process illustrated in FIG. 2 for subscription management based on viewing frequency. Referring to FIG. 3A, the process may start at block 300. In block 302, electronic subscription message monitor 112 may determine whether a new subscription message has been received. If it is determined that a new subscription message has not been received, the process may return to block 300. Otherwise, if it is determined that a new subscription message has been received, it is determined whether the subscription message is a confirmation of a new electronic subscription (block 304). If it is determined that the subscription message is a confirmation of a new electronic subscription, electronic subscription message monitor 112 may record and store data identifying the electronic subscription (block 306). In block 308, electronic subscription message monitor 112 may record and store data identifying unsubscribe information for the electronic subscription. For example, the data identifying the electronic subscription may be stored in electronic subscription database 120. Examples of data identifying an electronic subscription include keywords, digits, embedded images, audio clips, and source addresses. Examples of data identifying unsubscribe information include digits and keywords, such as "unsubscribe".

In block 304, if it is determined that the subscription message is not a confirmation of a new electronic subscription, it is determined whether the subscription message contains subscription content (block 310). For example, electronic subscription message monitor 112 may determine whether the subscription message contains subscription content. Exemplary subscription content may include news, music files, pictures, daily horoscopes, daily jokes, ring tones, television shows, movies, or any other digital media or data that may be obtained through a subscription. If it is determined that the subscription message does not contain subscription content, the process may return to block 300.

If it is determined in block 310 that the subscription message contains subscription content, interaction monitor function 114 may monitor user interaction with the subscription message (block 312). For example, the user interaction may include the receipt of input into electronic subscription client 108 for selecting the subscription message for viewing purposes. Referring to FIG. 3B, in block 314, interaction monitor function 114 may determine the viewing frequency for the electronic subscription. For example, the viewing frequency may be a ratio of the number of received subscription messages acted upon by a user to the number of received subscription messages. In block 316, interaction monitor function 114 may determine whether the viewing frequency meets predetermined tolerances. For example, interaction monitor function 114 may determine whether the viewing frequency ratio meets viewing frequency ratio tolerances. If it is determined that the viewing frequency ratio meets tolerances, the process may proceed to block 300. Otherwise, if it is determined that the viewing frequency ratio does not meet tolerances, interaction monitor function 114 may notify unsubscribe function 116 that the viewing frequency ratio for the electronic subscription does not meet tolerances.

In block 318, unsubscribe function 116 may present a prompt with a control configured for unsubscribing the user from receiving a future subscription message associated with the electronic subscription. For example, electronic subscription client 108 may use a display for displaying a prompt with a control configured to unsubscribe from receiving a future subscription message associated with the electronic subscription. In block 320, a response to the prompt is received from the user. The input may be to maintain the electronic subscription or to unsubscribe to the electronic subscription. In block 322, a subscription status in electronic subscription database 120 for the electronic subscription may be updated based on the input. The subscription status may be set to subscribe or unsubscribe to the electronic subscription. The process may then return to block 300.

Figure 4:
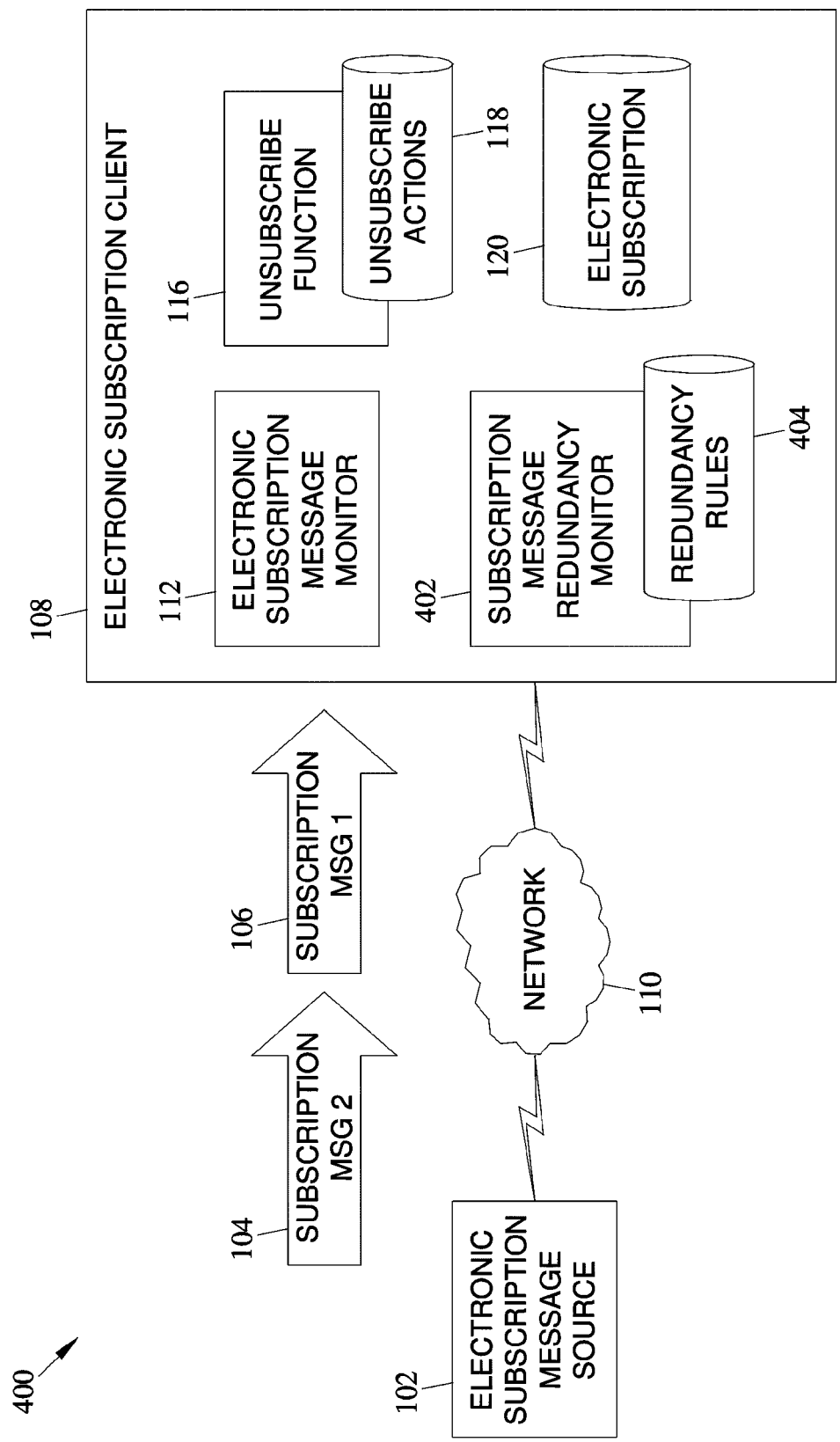
FIG. 4 is a block diagram of an exemplary system for managing electronic subscriptions according to the subject matter described herein.

FIG. 4 is a block diagram of an exemplary system 400 for managing electronic subscriptions according to the subject matter described herein. Similar to system 100 shown in FIG. 1, system 400 includes electronic subscription message source 102 configured to generate subscription messages and communicate the subscription messages to electronic subscription client 108 via network 110. Further, similar to system 100 shown in FIG. 1, electronic subscription client 108 includes electronic subscription message monitor 112 configured to monitor receipt of a subscription message associated with an electronic subscription via network 110. Further, electronic subscription client 108 shown in FIG. 4 includes unsubscribe function 116 and databases 118 and 120 having functionality similar to the corresponding function and databases as described above.

Electronic subscription client 108 may include means for determining whether a received subscription message is redundant based on at least one of an identifier for the subscription message or content included in the subscription message. For example, electronic subscription client 108 may include a subscription message redundancy monitor 402 configured to monitor determined whether a received subscription message is redundant based on an identifier for the subscription message and/or content included in the subscription message. In one example, monitor 402 may determine whether a received subscription message is redundant by determining whether redundancy exists between content of the received subscription message and content of one or more messages associated with another electronic subscription. In another example, monitor 402 may determine whether a received subscription message is redundant by determining whether redundancy exists between content of the received subscription message and content of one or more messages associated with another electronic subscription received previously, and may be limited to messages received within a predetermined time period of receipt of the subscription message. In another example, monitor 402 may determine whether a received subscription message is redundant by determining whether the received subscription message and one or more previously-received subscription messages have a threshold amount of common content. Content can include the subject or body of a message. For example, an e-mail may be considered redundant if the subject line of the e-mail matches (or nearly matches) a headline of a story, the name of a song/group/artist, the name of a concert/event, etc. In another example, monitor 402 may determine whether a received subscription message is redundant based on an examination of an identifier associated with the message and/or subscription. For example, monitor 402 may determine whether a received subscription message is redundant by determining whether one or more links, addresses, or URIs in the subscription message matches one or more links, addresses, URIs, or other content in one or more messages associated with another electronic subscription. Rules for determining redundancy may be stored in a redundancy rules database 404. Further, monitor 402 may provide information about a redundancy determination for a received subscription message to unsubscribe function 116.

Electronic subscription client 108 may include means for presenting, based on a redundancy determination, a prompt with a control configured for unsubscribing a user from receiving a future subscription message associated with the electronic subscription. For example, unsubscribe function 116 may be configured to present, based on a redundancy determination, a prompt with a control configured for unsubscribing a user from receiving a future subscription message associated with the electronic subscription, i.e., either subscription that is identified as redundant. In one example, unsubscribe function 116 may present a prompt configured for unsubscribing a user based on the determined redundancy contents of the subscription message and one or more messages associated with another electronic subscription. In another example, unsubscribe function 116 may present a prompt configured for unsubscribing a user from receiving a future subscription message associated with the electronic subscriptions for which a subscription message was received or another electronic subscription having electronic subscription messages with content that is redundant in comparison to the received subscription message. A user of electronic subscription client 108 may select the prompt for operating the control to unsubscribe the user from receiving future subscription messages associated with the electronic subscription. The control can be configured to implement one or more unsubscribe actions stored in database 118 in response to selection of the prompt. Unsubscribe function 114 may be configured to unsubscribe a user from receiving future subscription messages associated with an electronic subscription in response to receiving an input responsive to a prompt with a control for unsubscribing the user from receiving future subscription messages associated with the electronic subscription.

Figure 5:
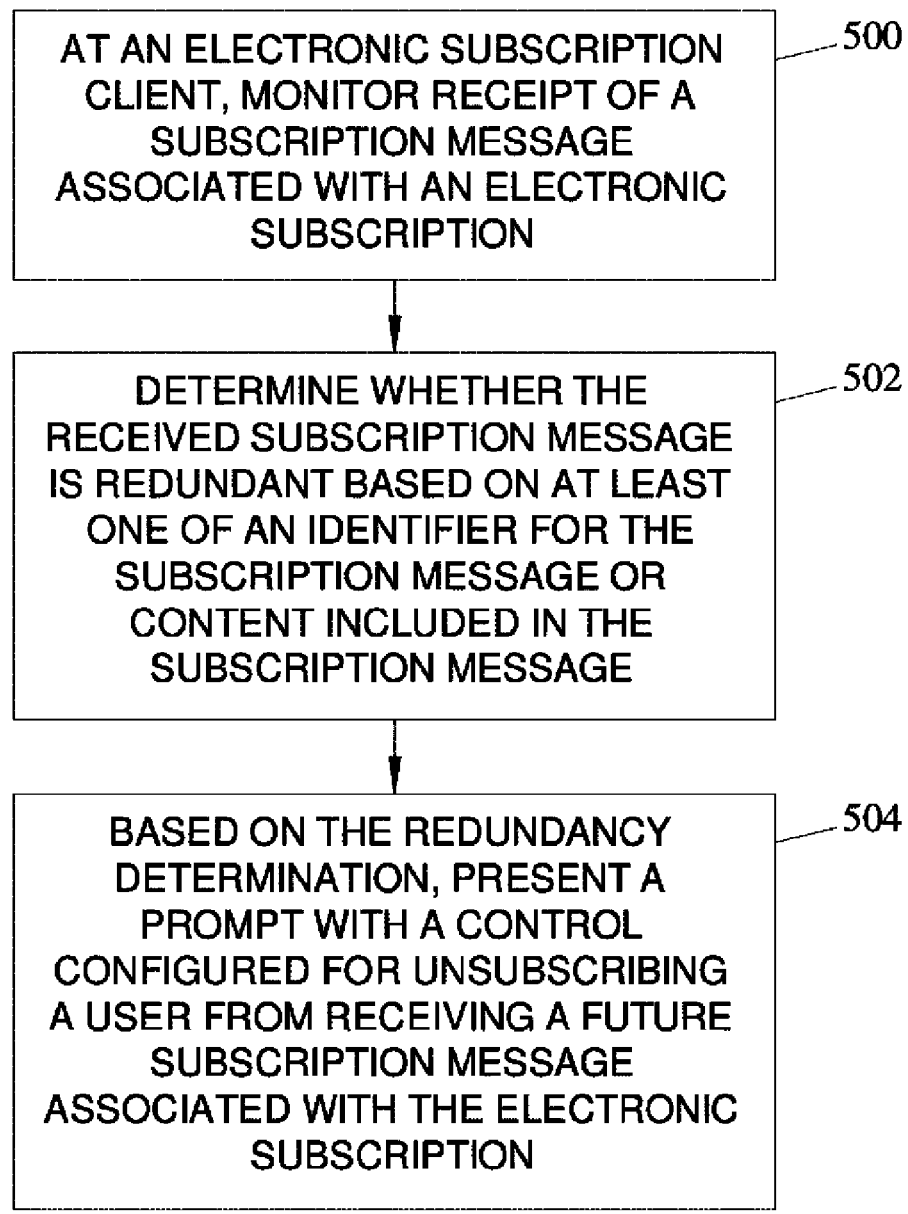
FIG. 5 is a flow chart illustrating an exemplary process for managing electronic subscriptions according to an embodiment of the subject matter described herein.

FIG. 5 is a flow chart illustrating an exemplary process for managing electronic subscriptions according to an embodiment of the subject matter described herein. Referring to FIG. 5, in block 500 the process provides for monitoring, at an electronic subscription client, receipt of a subscription message associated with an electronic subscription. For example, a process associated with system 100 may provide for electronic subscription message monitor 112 to monitor receipt of subscription messages 104 and 106 at electronic subscription client 108. In block 502, it is determined whether the received subscription message is redundant based on at least one of an identifier for the subscription message or content included in the subscription message. For example, subscription message redundancy monitor 402 may be configured to determine whether the received subscription message is redundant based on at least one of an identifier for the subscription message or content included in the subscription message. In block 504, a prompt may be present, based on the redundancy determination, with a control configured for unsubscribing a user from receiving a future subscription message associated with the electronic subscription. For example, unsubscribe function 116 may present a prompt with a control configured to unsubscribe the user from receiving a future subscription message associated with the electronic subscription. A user may select or otherwise activate the prompt for unsubscribing from receiving the future subscription message.

Figure 6A:
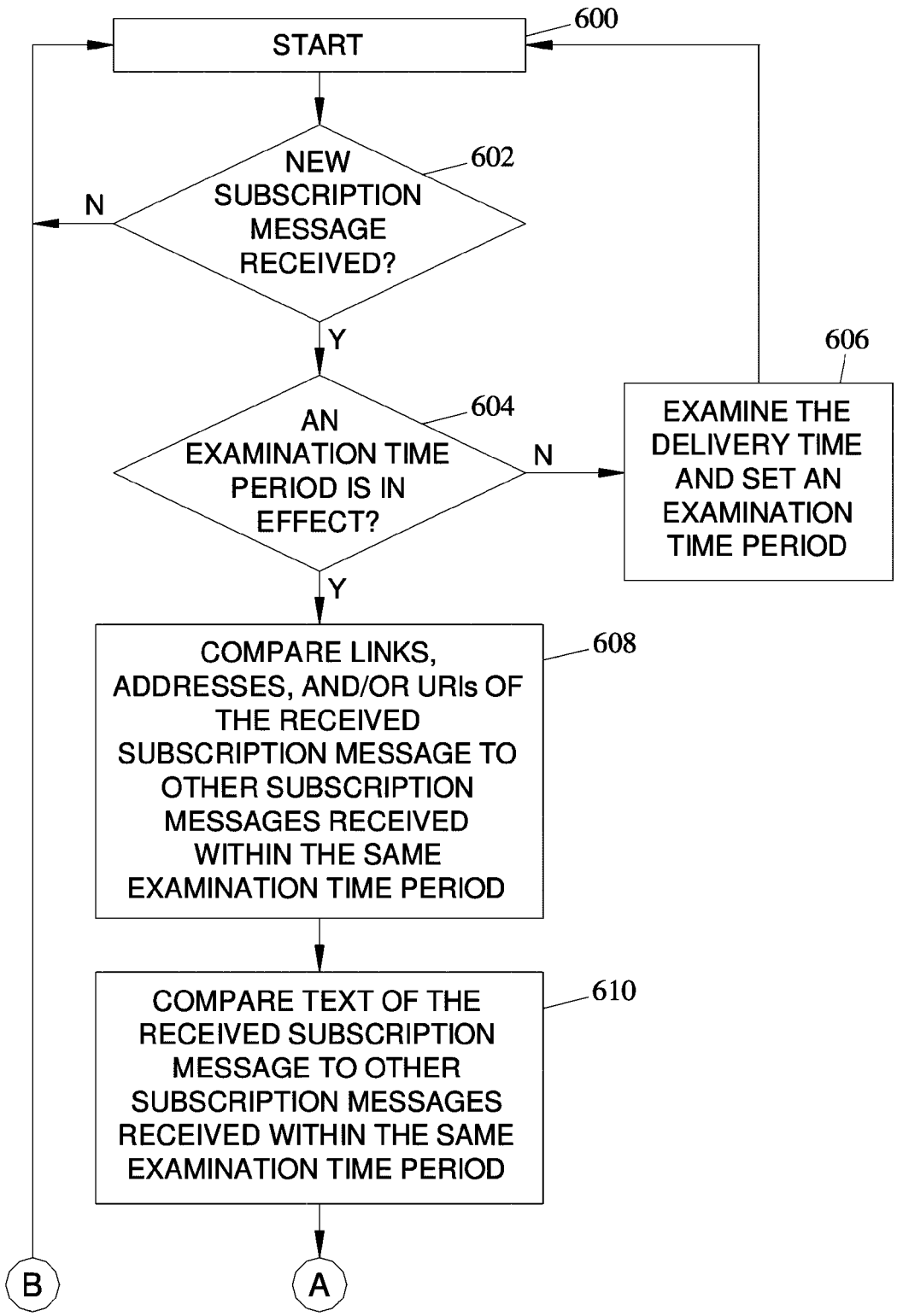
FIGS. 6A and 6B are a flow chart of an exemplary process for use by the system shown in FIG. 4 for managing electronic subscriptions according to an embodiment of the subject matter described herein.
Figure 6B:
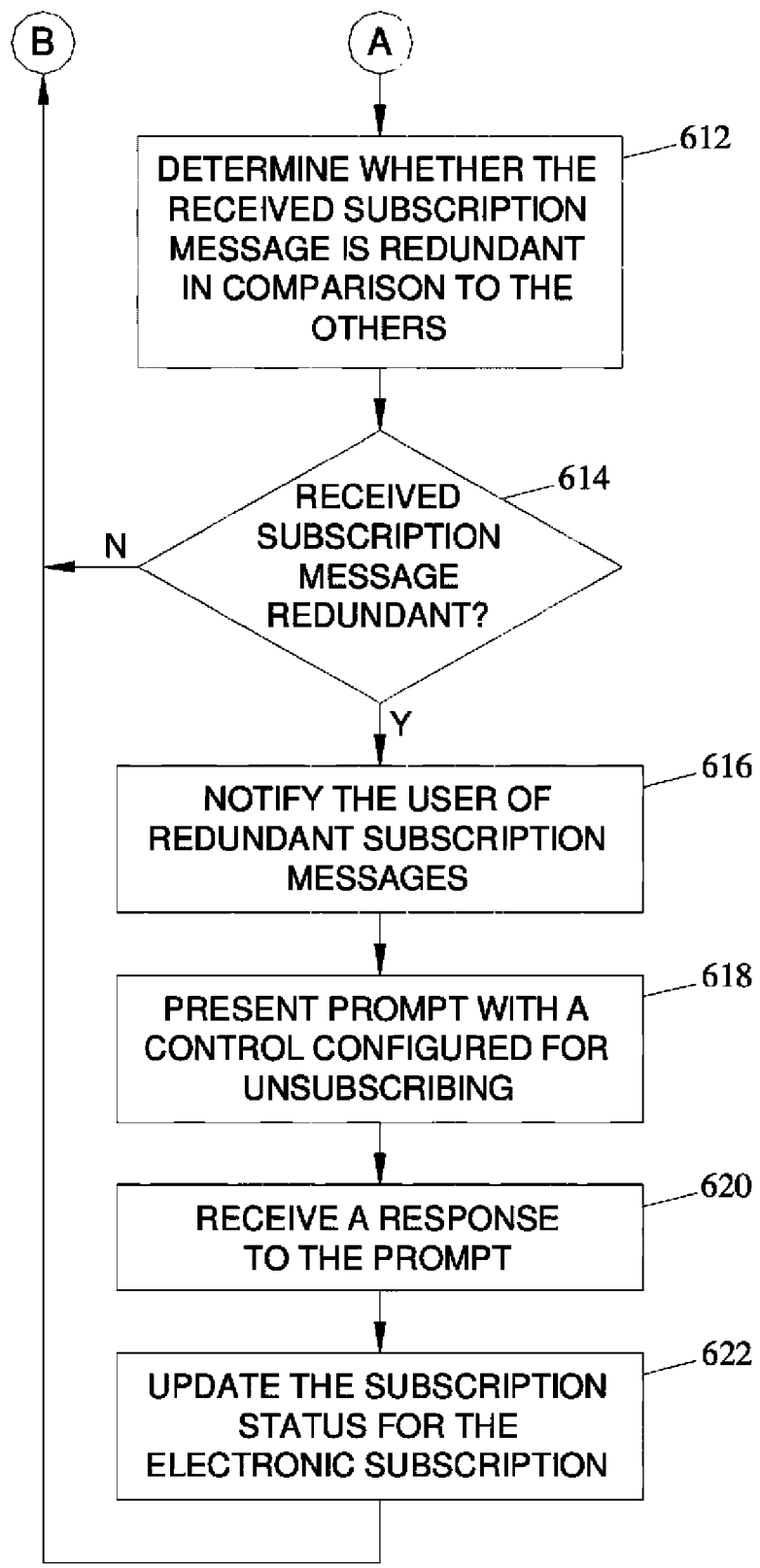

FIGS. 6A and 6B are a flow chart illustrating an exemplary process for use by system 400 shown in FIG. 4 for managing electronic subscriptions according to an embodiment of the subject matter described herein. FIGS. 6A and 6B illustrate in more detail the process illustrated in FIG. 5 for managing electronic subscriptions based on redundancy determinations. Referring to FIG. 6A, the process may start at block 600. In block 602, electronic subscription message monitor 112 may determine whether a new subscription message has been received. If it is determined that a new subscription message has not been received, the process may return to block 600. Otherwise, if it is determined that a new subscription message has been received, it is determined whether a predetermined examination time period is in effect (block 604). The examination time period is a time period set within which it is determined whether there is redundancy between content of the new received subscription message and content of one or more messages associated with another electronic subscription. If it is determined that the examination time period is not in effect, electronic subscription message monitor 112 may examine the delivery time of the new subscription message and set an examination time period to start (block 606).

If it is determined that the examination time is in effect, subscription message redundancy monitor 402 compares links, addresses, and/or URIs of the received subscription message to other subscription messages received within the same examination time period (block 608). The links, addresses, and/or URIs may be contained within a subscription message. In block 610, subscription message redundancy monitor 402 compares text or content of the received subscription message to the text or content of other subscription messages received within the same examination time period (block 610). Referring to FIG. 6B, in block 612, subscription message redundancy monitor 402 determines whether the received subscription message is redundant in comparison to the other subscription messages received within the same examination time period. The redundancy determination may be based on the comparisons performed in blocks 608 and 610. For example, subscription message redundancy monitor 402 may determine redundancy by determining whether the received subscription message and one or more previously-received subscription messages have a threshold amount of common content. In one example, monitor 402 may determine whether a received subscription message is redundant by determining whether one or more links, addresses, or URIs in the subscription message matches one or more links, addresses, or URIs in one or more messages associated with another electronic subscription.

In block 614, subscription message redundancy monitor 402 determines whether the received subscription message is redundant. If it is determined that the received subscription message is not redundant, the process proceeds to block 600. Otherwise, if it is determined that the received subscription message is redundant, subscription message redundancy monitor 402 may notify the user of redundant subscription messages. For example, monitor 402 may use a display of electronic subscription client 108 for displaying a notification of redundancy for the received subscription messages and one or more of the other subscription messages used in the redundancy determination.

In block 618, subscription message redundancy monitor 402 may present a prompt with a control configured for unsubscribing the user from receiving a future subscription message associated with the electronic subscription. For example, subscription message redundancy monitor 402 may use a display for displaying a prompt with a control configured to unsubscribe from receiving a future subscription message associated with the electronic subscription. In block 620, a response to the prompt is received from the user. The input may be to maintain the electronic subscription or to unsubscribe to the electronic subscription one or more of the other electronic subscriptions associated with the other subscription messages used in the redundancy determination. In block 622, a subscription status in electronic subscription database 120 for the electronic subscription may be updated based on the input. The subscription status may be set to subscribe or unsubscribe to the electronic subscriptions. The process may then return to block 600.

Figure 7:
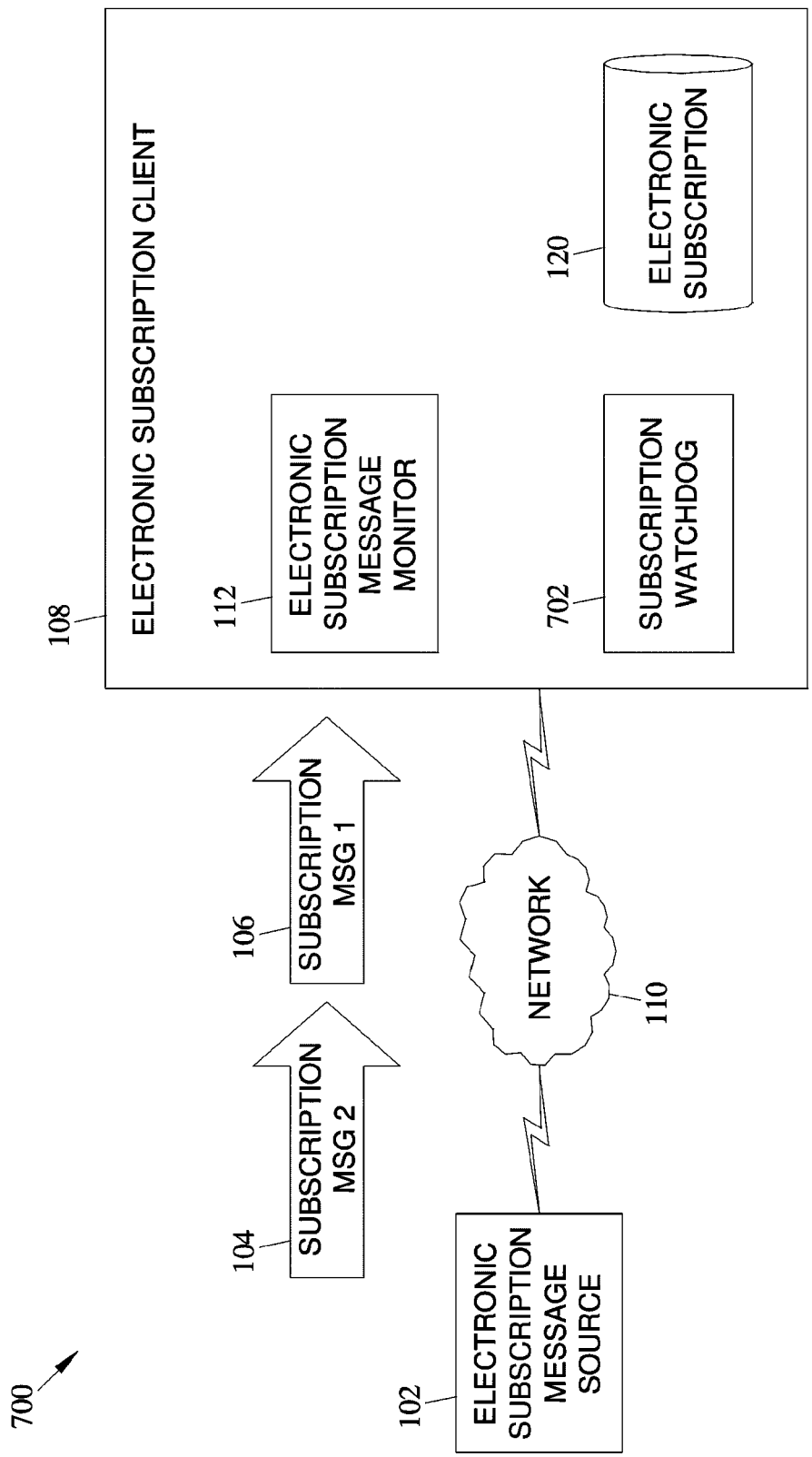
FIG. 7 is a block diagram of an exemplary system for managing electronic subscriptions according to the subject matter described herein.

FIG. 7 is a block diagram of an exemplary system 700 for managing electronic subscriptions according to the subject matter described herein. Similar to system 100 shown in FIG. 1, system 700 includes electronic subscription message source 102 configured to generate subscription messages and communicate the subscription messages to electronic subscription client 108 via network 110. Further, similar to system 100 shown in FIG. 1, electronic subscription client 108 includes electronic subscription message monitor 112 configured to monitor receipt of a subscription message associated with an electronic subscription via network 110. Further, electronic subscription client 108 shown in FIG. 7 includes electronic subscription database 120 having functionality similar to the database as described above.

Electronic subscription client 108 may include means for saving a subscription identifier for an unsubscribed-from electronic subscription. For example, electronic subscription message monitor 112 may save a subscription identifier for an unsubscribed-from electronic subscription. Exemplary subscription identifiers include a subscription source identifier and subscription status information. Based on the subscription identifier for the received subscription message, it may be determined that the subscription message is associated with an electronic subscription that was previously unsubscribed-from. Electronic subscription database 120 may store subscription status information indicating that an electronic subscription was previously unsubscribed-from. In one example, a subscription message including a subscription identifier may be a subscription message for subscribing to the electronic subscription.

Electronic subscription client 108 may include means for receiving input corresponding to a subscription identifier for subscribing to the unsubscribed-from electronic subscription. For example, a subscription watchdog function 702 may be configured to receive input corresponding to a subscription identifier for subscribing to the unsubscribed-from electronic subscription. In one example, a user of electronic subscription client 108 may input data corresponding to a subscription identifier for subscribing to the unsubscribed-from electronic subscription.

Electronic subscription client 108 may include means for presenting an indication that the electronic subscription has been previously unsubscribed-from. For example, subscription watchdog function 702 may present an indication that the electronic subscription has been previously unsubscribed-from. In one example, subscription watchdog function 702 may use a display for indicating that the electronic subscription associated with a received subscription message has been previously unsubscribed-from.

Figure 8:
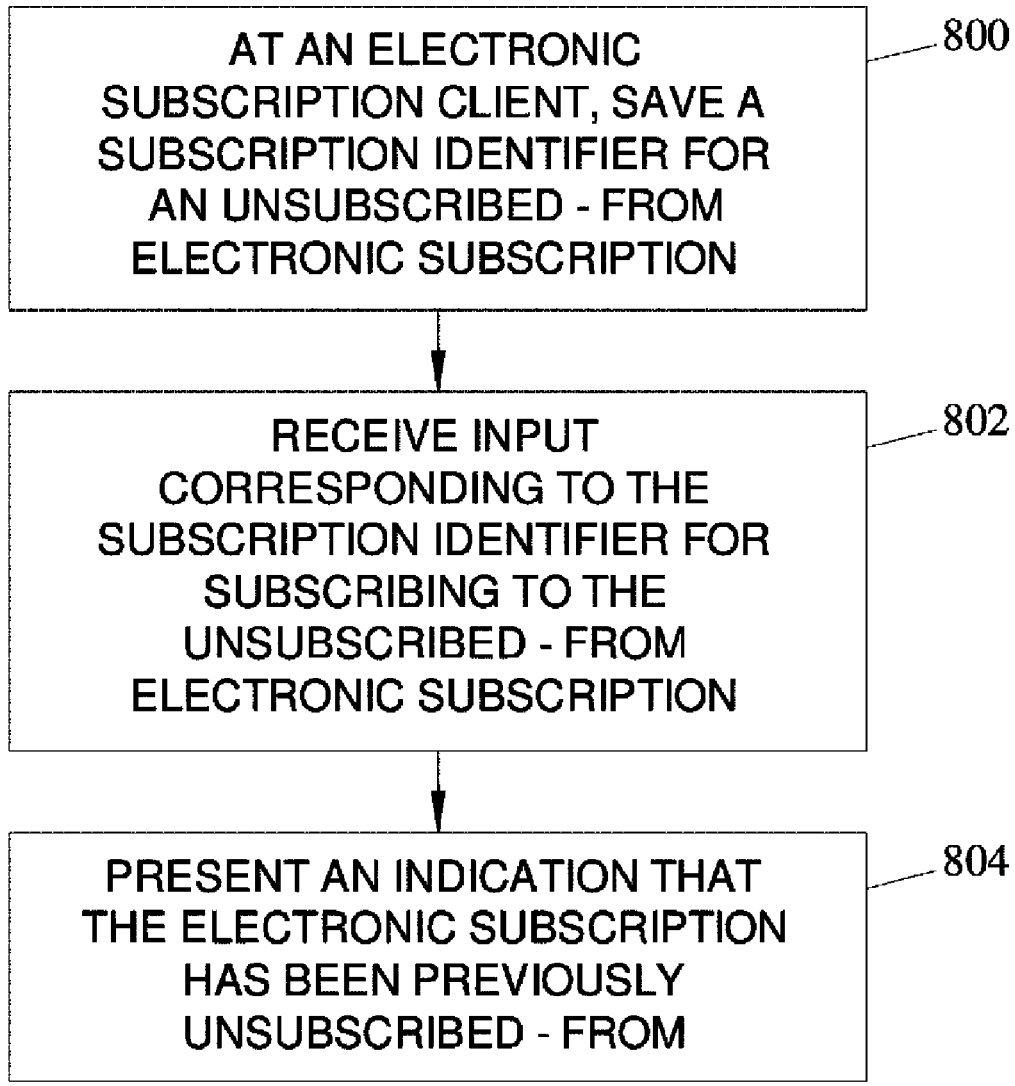
FIG. 8 is a flow chart of an exemplary process for managing electronic subscriptions according to an embodiment of the subject matter described herein.

FIG. 8 is a flow chart illustrating an exemplary process for managing electronic subscriptions according to an embodiment of the subject matter described herein. Referring to FIG. 8, in block 800 the process provides for saving, at an electronic subscription client, a subscription identifier for an unsubscribed-from electronic subscription. For example, a process associated with system 700 may provide for electronic subscription message monitor 112 to save at database 120 a subscription identifier for an unsubscribed-from electronic subscription. In block 802, input may be received that corresponds to the subscription identifier for subscribing to the unsubscribed-from electronic subscription. Further, in block 804, an indication may be presented that the electronic subscription has been previously unsubscribed-from. Further, for example, a user of electronic subscription client 108 may be provided a prompt with a control configured to subscribe or not subscribe to the previously unsubscribed-from electronic subscription.

Figure 9A:
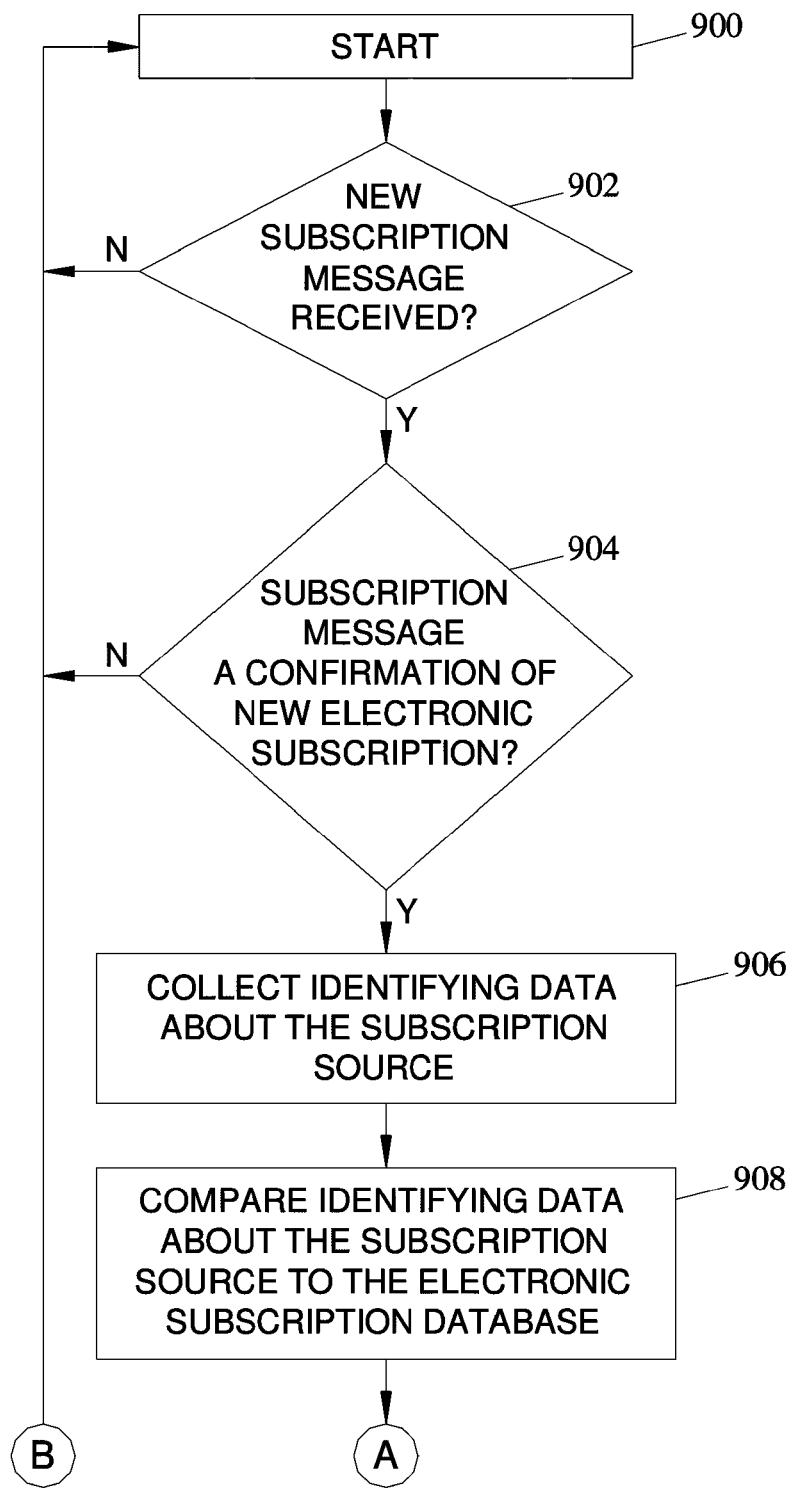
FIGS. 9A and 9B are a flow chart of an exemplary process for use by the system shown in FIG. 7 for managing electronic subscriptions according to an embodiment of the subject matter described herein.
Figure 9B:
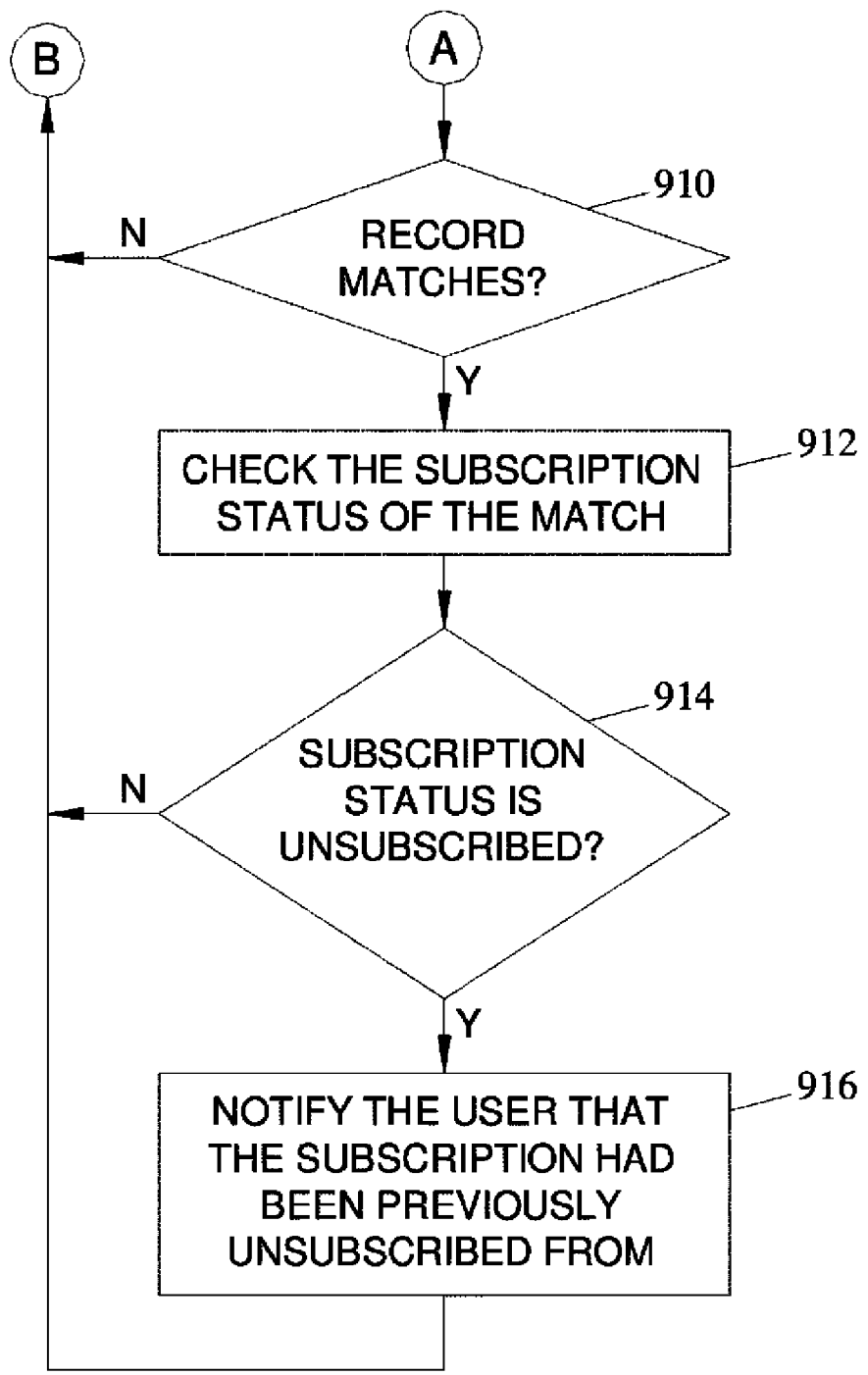

FIGS. 9A and 9B are a flow chart illustrating an exemplary process for use by system 700 shown in FIG. 7 for managing electronic subscriptions according to an embodiment of the subject matter described herein. The process illustrated in FIGS. 9A and 9B illustrates in more detail the process for managing electronic subscriptions based on previous unsubscription actions illustrated in FIG. 7. Referring to FIG. 9, the process may start at block 900. In block 902, electronic subscription message monitor 112 may determine whether a new subscription message has been received. If it is determined that a new subscription message has not been received, the process may return to block 900. Otherwise, if it is determined that a new subscription message has been received, it is determined whether the received subscription message is a confirmation of a new subscription (block 904). If it is determined that the received subscription message is not a confirmation of a new subscription, the process may return to block 900.

If it is determined that the received subscription message is a confirmation of a new subscription, electronic subscription message monitor 112 may collect identifying data about the subscription source (block 906). The identifying data about the subscription source may be contained in the received subscription message. The identifying data may be a subscription source identifier and/or subscription status information. Subscription watchdog function 702 may compare the identifying data about the subscription source to records in electronic subscription database 120 (block 908). Referring to FIG. 9B, in block 910, subscription watchdog function 702 may determine whether a record in database 120 matches the identifying data about the subscription source. If it is determined that a record does not match, the process can proceed to block 900.

If it is determined that a record does match, subscription watchdog function 702 may determine whether the subscription status in the matching record indicates that the corresponding electronic subscription has been previously unsubscribed-from (block 914). If it is determined that the corresponding electronic subscription has not been previously unsubscribed-from, the process can proceed to block 900. Otherwise, if it is determined that the corresponding electronic subscription has been previously unsubscribed-from, subscription watchdog function 702 may notify the user of electronic subscription client 108 that the electronic subscription associated with the received subscription message had been previously subscribed to and was subsequently unsubscribed-from (block 916).

Electronic subscriptions may be obtained by communicating a subscription request to an electronic subscription message source. For example, when an e-mail client is utilized as an electronic subscription client, an electronic subscription may be requested by completion of a web-based form that collects a user's e-mail address and other pertinent information. In another example, when an RSS aggregator or a personalized web browser is utilized as an electronic subscription client, an electronic subscription may be requested by clicking on an RSS icon located within a web page of an electronic subscription source.

When an electronic subscription request is received, confirmation of the electronic subscription may be provided to an electronic subscription client. For example, an e-mail may be communicated by an electronic subscription source to an electronic subscription client for confirming the subscription.

In this example, the electronic subscription client may request a subscription via a web-based form. The following is an example of e-mail message content for confirming a subscription.

```
Hi! This is the ezmlm program. I'm managing the ms-
  secnews@securityfocus.com mailing list.
I'm working for my owner, who can be reached at ms-secnews-
  owner@securityfocus.com.
Acknowledgment: I have added the address
  john.q.public@somecompany.com
to the ms-secnews mailing list.
Welcome to ms-secnews@securityfocus.com!
Please save this message so that you know the address you are
  subscribed under, in case you later want to unsubscribe or change
  your subscription address.
To unsubscribe, send a message to:
  <ms-secnews-unsubscribe-
john.q.public=somecompany.com@securityfocus.com>
```

The above example was generated by a MajorDomo or LIST-SERV program, as an example at URL: http://www.webopedia.com/TERM/M/Majordomo.html.

Figure 10:
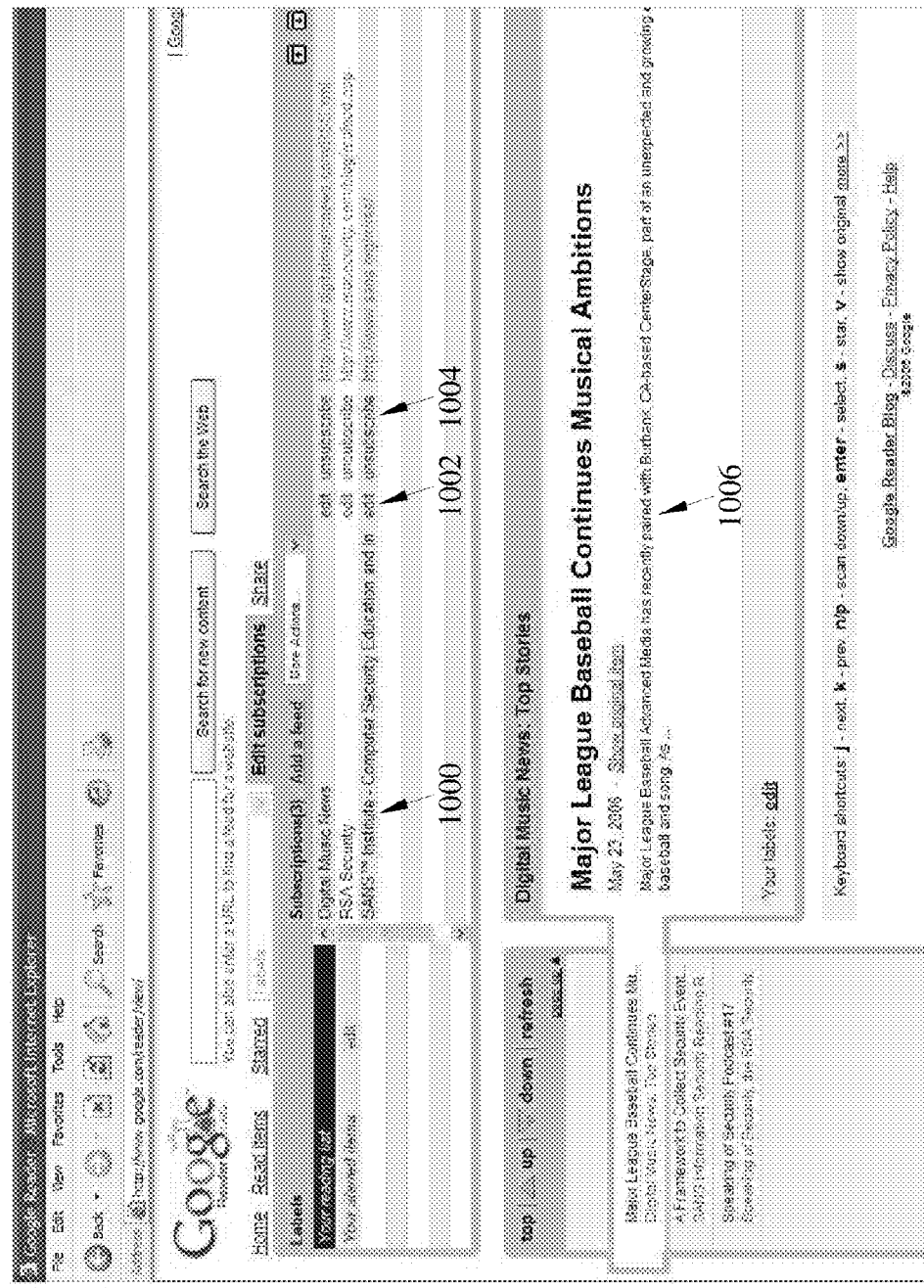
FIG. 10 is a computer screenshot displayed by a display of an RSS electronic client device of an exemplary RSS feed web page for subscribing and unsubscribing to electronic subscriptions according to an embodiment of the subject matter described herein.

FIG. 10 illustrates a computer screenshot displayed by a display of an RSS electronic client device of an exemplary RSS feed web page for subscribing and unsubscribing to electronic subscriptions according to an embodiment of the subject matter described herein. Subscription content is posted to an RSS reader or a web page. In this example, a user has three subscriptions, generally designated 1000. The user may select an edit icon 1002 for editing a corresponding subscription. Further, the user may select an unsubscribe icon 1004 for unsubscribing from a corresponding subscription. Instructions for unsubscribing by selecting an unsubscribe icon corresponding to an electronic subscription may be stored in an unsubscribe actions database, such as database 118 shown in FIG. 1. An unsubscribe function 116 may unsubscribe from an electronic subscription by accessing and implementing instructions stored in database 118. The screenshot also includes exemplary subscription message content 1006.

Figure 11:
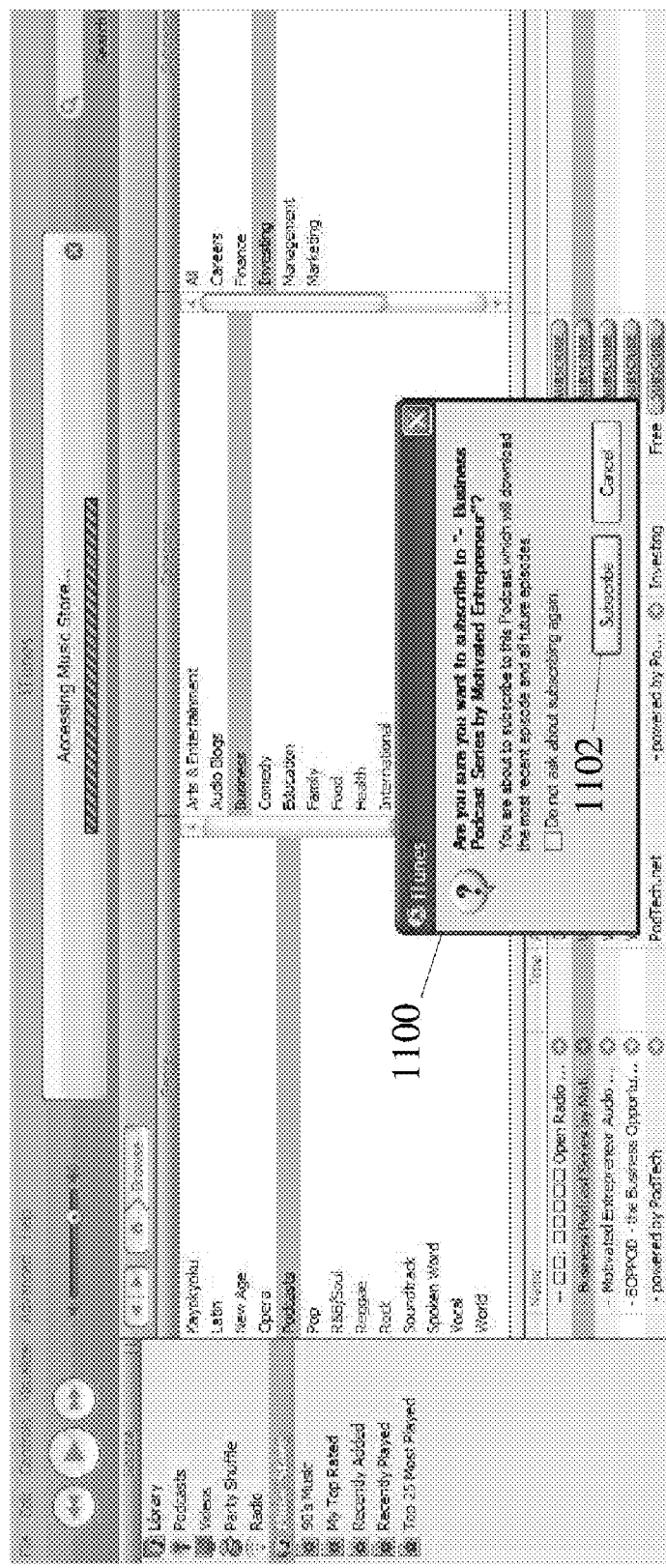
FIG. 11 is a computer screenshot of a window including a subscribe button, a subscription list, and an unsubscribe icon according to an embodiment of the subject matter described herein.

FIGS. 11-13 illustrate computer screenshots displayed by a display of a media player electronic client device of an exemplary media player interface for subscribing and unsubscribing to electronic subscriptions according to an embodiment of the subject matter described herein. FIGS. 11-13 include an example of displaying subscribing to an iTunes PodCast, a subscription list, and an unsubscribe icon. Referring to FIG. 11, a window 1100 includes a subscribe button 1102 for subscribing to a PodCast video provided by iTunes. Referring to FIG. 12, a list 1200 of electronic subscriptions is shown. Referring to FIG. 13, an unsubscribe button 1300 is shown that may be selected for unsubscribing to a corresponding electronic subscription. Instructions for unsubscribing by selecting an unsubscribe icon corresponding to an electronic subscription may be stored in an unsubscribe actions database, such as database 118 shown in FIG. 1. An unsubscribe function 116 may unsubscribe from an electronic subscription by accessing and implementing instructions stored in database 118.

In one embodiment, an electronic subscription message monitor may monitor all messages received by an electronic subscription client to determine whether any of the messages are new subscription confirmation messages. The electronic subscription message monitor may be adapted to recognize subscription confirmation messages for any type of electronic subscription client. If the electronic subscription client is an e-mail application, the electronic subscription message monitor may recognize a new subscription confirmation message by text contained within an e-mail message. For example, the electronic subscription message monitor may review text of the subject line or body of an e-mail message for key words, such as "subscribe," "mailing list," and "unsubscribe," for determining that the message is a new subscription confirmation message. If the electronic subscription client is an RSS reader, the electronic subscription message monitor may recognize a new subscription confirmation message by determining that a URL has been added to a reading list of the RSS reader or that the reading list has been updated. If the electronic subscription client is media player client, the electronic subscription message monitor may recognize a new subscription confirmation message by determining that a new entry has been added to a library of the media player client.

In one embodiment, a record of an electronic subscription may be created and added to an electronic subscription database when a subscription confirmation message is recognized. The record is created and added to the database so that subscription messages can be monitored to see if they are associated with the electronic subscription. Table 1 below shows exemplary records of an electronic subscription database according to the subject matter described herein.

TABLE 1

Electronic Subscription Database

| Subscription Name | Source | Subscription Status | Date Initialized | Msgs Rcd'd (MR) | Msgs Acted Upon (MAU) | Viewing Frequency | Interaction Rule Name |
|---|---|---|---|---|---|---|---|
| Microsoft Security Newsletter | ms-secnews@security.focus.com | Permanent | May 23, 2006 | 1 | 0 | N/A | N/A |
| Linux Security Newsletter | linux-secnews@securityfocus.com | Active | Aug. 02, 2004 | 50 | 45 | 90% | Security |
| Security Focus Newsletter | sf-news@securityfocus.com | Unsubscribed | Dec. 22, 2005 | 23 | 10 | 43% | Security |

In Table 1, the subscription name field includes an identifier for an electronic subscription to enable the coordination of actions taken for managing electronic subscriptions. The source field may contain a URL or e-mail address associated with the electronic subscription message source. The subscribe status field may be set according to user decisions about electronic subscriptions. For example, an electronic subscription may be set to permanent, active, or unsubscribed. The date initialized field may contain the date that an electronic subscription was initially confirmed and may be utilized for actions defined by unsubscribe rules described herein. The messages read (MR) field may include a count of received message associated with an electronic subscription after the initialization date. The messages acted upon (MAU) field may include a count of received messages acted upon by a user. For example, an MAU count may increase in the case of an e-mail subscription message when a user reads or opens the e-mail subscription message. In another example, a MAU count may increase in the case of a Podcast when a user plays or views the Podcast. The viewing frequency field may contain a ratio of the MAU and the MR for the electronic subscription. The MAU-to-MR ratio may be used to determine whether to prompt a user with a control configured to unsubscribe a user from receiving future messages associated with the electronic subscription. The interaction rule field may include a rule name selected for the electronic subscription that is used to determine user interaction with the subscription messages of the electronic subscription.

In one embodiment, an electronic subscription message monitor may notify an unsubscribe function of a new electronic subscription and provide information about actions for unsubscribing to the electronic subscription. The unsubscribe actions may be stored in an unsubscribe actions database. The unsubscribe actions in the database may be associated with a subscription name so that the unsubscribe actions can be retrieved when the unsubscribe function receives instructions for unsubscribing to the named electronic subscription. The unsubscribe function may retrieve and implement instructions for unsubscribing from the unsubscribe actions database. Further, the unsubscribe function may determine actions needed for unsubscribing to an electronic subscription. One exemplary unsubscribe action for an e-mail subscription client includes sending an e-mail to an electronic message subscription source with an appropriate unsubscribe subject line. Another exemplary unsubscribe action for an e-mail subscription client includes opening a web link contained in a subscription confirmation message that removes the subscribers address from a subscription list when the HTML of the web link is loaded. One exemplary unsubscribe action for an RSS subscription client includes deleting the source URL associated with the electronic subscription from an RSS reading list.

Table 2 below shows exemplary records of an unsubscribe actions database according to the subject matter described herein.

TABLE 2

Unsubscribe Actions Database

| Subscription Name | Unsubscribe Action | Related Data |
|---|---|---|
| Microsoft Security Newsletter | Send a reply unsubscribe e-mail | Message 123 in drafts folder |
| Linux Security Newsletter | Delete URL from client | <del> www.yoursub.com from reading list |
| Security Focus Newsletter | Execute web link | https://unsubscribe.yoursub.org |

For the electronic subscription named Microsoft Security Newsletter, the electronic subscription can be unsubscribed from by sending a reply to an unsubscribe e-mail. For example, the e-mail message identified as Message 123 in the drafts folder may be sent for unsubscribing to the electronic subscription. For the electronic subscription named Linux Security Newsletter, the URL associated with the associated reading list may be deleted to unsubscribe. For example, the URL <www.yoursub.com> may be deleted from the reading list. For the electronic subscription named Security Focus Newsletter, the web link <https://unsubscribe.yoursub.org> may be executed for unsubscribing from the electronic subscription.

In one embodiment, an electronic subscription message monitor may determine whether a received message contains subscription-related content or that the message is a subscription message. In one example, the monitor may determine that the received message contains subscription-related content or that the message is a subscription message by comparing a source address for the message to source addresses stored in an electronic subscription database. If a record is found with a matching source address, the monitor may determine that the received message contains subscription-related content or that the message is a subscription message.

In one embodiment, a viewing frequency of received subscription messages associated with an electronic subscription may be based on a ratio of a number of subscription messages acted upon by a user to a number of received subscription messages. An electronic subscription database may maintain counts of the numbers of subscription messages acted upon by a user and the numbers of received subscription messages for each electronic subscription. In one example, when an electronic subscription message monitor determines that a newly received message is associated with an electronic subscription, an interaction monitor function may be notified to start monitoring the subscription message in relation to the subscription. The interaction monitor function may determine whether a subscription message is acted upon by a user. For example, the interaction monitor function may determine whether the subscription message has been opened or not opened. In some instances, if an interaction monitor function is not integrated with an electronic subscription client, the interaction monitor function may suitably interface with the electronic subscription client to determine user interaction with subscription messages.

In one embodiment, an interaction monitor function may apply one or more interaction rules for determining interaction of a user with a received subscription message. One exemplary interaction rule includes monitoring reading of an e-mail subscription message to determine whether the user reads or opens the e-mail subscription message. In this example, if the user reads or opens the e-mail subscription message, the user has interacted with the subscription message. Another exemplary interaction rule includes monitoring viewing of a video file received in a subscription message to determine whether the user views the video file. In this example, if the user views the video file, the user has interacted with the subscription message. Interaction rules may be set to default levels or customized per electronic subscription or electronic subscription type. Further, the interaction rules may be suitably configured based upon a volume of subscription messages being received.

Table 3 below shows an exemplary interaction rule record according to the subject matter described herein.

TABLE 3

Interaction Rule Record

| Interaction Rule Name | Message Timer | Clipping Level |
|---|---|---|
| Default | 7 days | <50% |
| Security | 30 days | <75% |
| World News | 1 day | <65% |

In Table 3, the interaction rule name field contains a name of the rule that can be applied to a particular electronic subscription. Message timer field contains an indication of a time period that an interaction monitor function should wait before determining a viewing frequency based on when a new subscription message arrived. The clipping level field indicates a viewing frequency percentage tolerance level that can be used for determining whether a user should be prompted with a control configured to unsubscribe the user from receiving future subscription messages associated with the electronic subscription. Interaction rules may also include grace periods or delay timers to allow for subscription messages to be received for a longer period of time than in an interaction rule before determining a viewing frequency for an electronic subscription.

In one embodiment, an unsubscribe function may control presentation of a prompt with a control configured for unsubscribing a user from receiving a future subscription message associated with an electronic subscription. For example, the prompt may be displayed using a display of the electronic subscription client. The following is an exemplary notification to a user that an unsubscribe action may be taken for an electronic subscription.

| The following subscription does not meet the viewing frequency tolerances, would you like to unsubscribe from it? ||
|---|---|
| Subscription Name | Unsubscribe (Check Box) |
| Microsoft Security Newsletter | ☐ |

The notification may be presented when interaction monitor function determines that the viewing frequency associated with the subscription is below a clipping level for the subscription. A user can input instructions for unsubscribing by selecting the unsubscribe box displayed in the prompt. Once unsubscribe instructions are input, the unsubscribe function may implement unsubscribe actions for unsubscribing the electronic subscription client from the subscription. Further, a subscription status field for the subscription in the electronic subscription database may be updated to indicate that the status is unsubscribed.

In one embodiment, a subscription message redundancy monitor may be notified by electronic subscription monitor when a subscription message is received having new content. The subscription message redundancy monitor may be configured to determine whether a received subscription message have a predetermined amount of content common to other received subscription messages for other electronic subscriptions. As stated above, subscription message redundancy may determine whether an examination period is in effect.

The examination period may define a time period within which the subscription message redundancy monitor examines messages for redundancy. For example, if an examination period is set for 4 hours and not subscription messages are received within the 4-hour examination period, the subscription message redundancy monitor will not determine redundancy for the messages. An exemplary messaging scenario having a 4-hour examination period follows:

1. A subscription message is received at 8:00 a.m.
2. An examination period is set for 4 hours. Therefore, the examination period will expire at 12:00 p.m.
3. All subscription messages received between 8:00 a.m. and 12:00 p.m. will be compared to one another for redundancy.
4. At 12:00 p.m., the active examination period expires. None of the subscription messages received after 12:00 p.m. will be compared to the subscription messages received prior to 12:00 p.m.
5. A subscription message is received at 12:30 p.m.
6. A new examination period is set for 4 hours. Therefore, the examination period will expire at 4:30 p.m.

In an alternative embodiment, an examination time period may be set for monitoring newly received subscription messages and for comparing the messages to other subscription messages received within a previous time period equal to the examination time period.

In one embodiment using an examination time period, new subscription messages may be received and similarity equations (SEs) may be applied to each subscription message received during the examination time period.

Similarity equations are used to determine the amount of content that messages must have in common to be identified as redundant. An exemplary messaging scenario using similarity equations follows:

1. Receive a first subscription message within the examination time period.
2. Receive a second subscription message within the examination time period.
3. Compare the second subscription message to the first subscription message for a redundancy determination.
4. Receive a third subscription message within the examination time period.
5. Compare the third subscription message to the first and second subscription messages for a redundancy determination.

In one example, a similarity comparison can include a content comparison of subscription messages. For example, a difference function can be executed on the text contained in a set of subscription messages. The difference return value may be set as a similarity value. For example, if the number of lines of text in the subscription messages with differences is 5, the subscription messages may be determined to contain substantially the same content.

In another example, a similarity comparison can include a comparison of links contained in subscription messages. For example, web links (e.g., URLs) with subscription messages may be compared. If it is determined that all of the web links are identical, the subscription messages may be considered to be redundant. The similarity value may be set as the percentage of links that are identical. For example, if 90% of the URLs contained in the body of two or more subscription messages are identical, the subscription messages may be considered to contain the substantially the same content.

A subscription message redundancy monitor may apply redundancy rules for evaluating results generated by similarity equations. For example, redundancy rules may define tolerance levels for determining whether subscription messages are redundant. In the above example of the number of lines of text with differences being 5, redundancy rules may be applied that compare the number 5 to a threshold level number of text lines. In this example, the subscription messages may be determined to be redundant if the number of text lines with differences is less than a predetermined number 8. Thus, in this example, the subscription messages are considered redundant. In the above example of 90% of the URLs contained in the body of subscription messages being identical, it may be determined that the subscription messages are redundant based on a comparison of 90% to a threshold level percentage. In this example, if the 90% is greater than the threshold level percentage, the subscription messages are considered redundant.

Table 4 below shows exemplary entries of a content rules database according to an embodiment of the subject matter described herein.

TABLE 4

Content Rules Database

| Rule Name | Value |
| --- | --- |
| Examination Time Period | 4 hours |
| Link Comparison | 95% |
| Full Text Comparison | Less than 8 lines different |

In one example, the examination time period is four hours. In this example, the examination time period is the time period set for monitoring newly received subscription messages and for comparing the messages to other subscription messages received within a previous time period equal to the examination time period. In another example, the link comparison is the percentage links that must be identical in subscription messages for determining that the subscription messages are redundant. In this example, the percentage is 95%. In another example, the full text comparison is the number of lines in subscription messages that must be different for determining that the subscription messages are redundant. In this example, less than 8 lines in subscription messages must be different for determining that the subscription messages are redundant.

In one embodiment, a subscription name associated with an electronic subscription may be presented to a user in a prompt for indicating that a subscription message associated with the electronic subscription. For example, if a subscription message redundancy monitor determines that a subscription message is redundant, a subscription name associated with the subscription message may be displayed. For example, the subscription name column in Table 2 above includes a listing of exemplary subscription names that may be displayed to a user. In one example, the subscription name may be presented in a pop-up message, such as in a pop-up window. The subscription name may also be associated with an icon or button that may be selected by a user for unsubscribing to the electronic subscription. In another example, information regarding redundancy may be presented to a user via an e-mail message, SMS message, and/or other suitable type of electronic message.

In one embodiment, a user may be allowed to select one or more electronic subscriptions to unsubscribe from if subscription messages of the electronic subscriptions are determined to be redundant. The following is an exemplary pop-up notification message to a user that electronic subscription messages include redundant information.

| The following subscriptions contain much of the same information. Would you like to unsubscribe from one of them? | |
| --- | --- |
| Subscription Name | Unsubscribe (Check One) |
| Microsoft Security Newsletter | ☐ |
| Security Focus Newsletter | ☐ |

A user may select one of the unsubscribe boxes for unsubscribing to the corresponding electronic subscription. After selection of one of the unsubscribe boxes, a message may be sent to an electronic message subscription source for unsubscribing the associated electronic subscription client. Further, the subscribe status for the electronic subscription can be set to unsubscribe.

Figure 14:
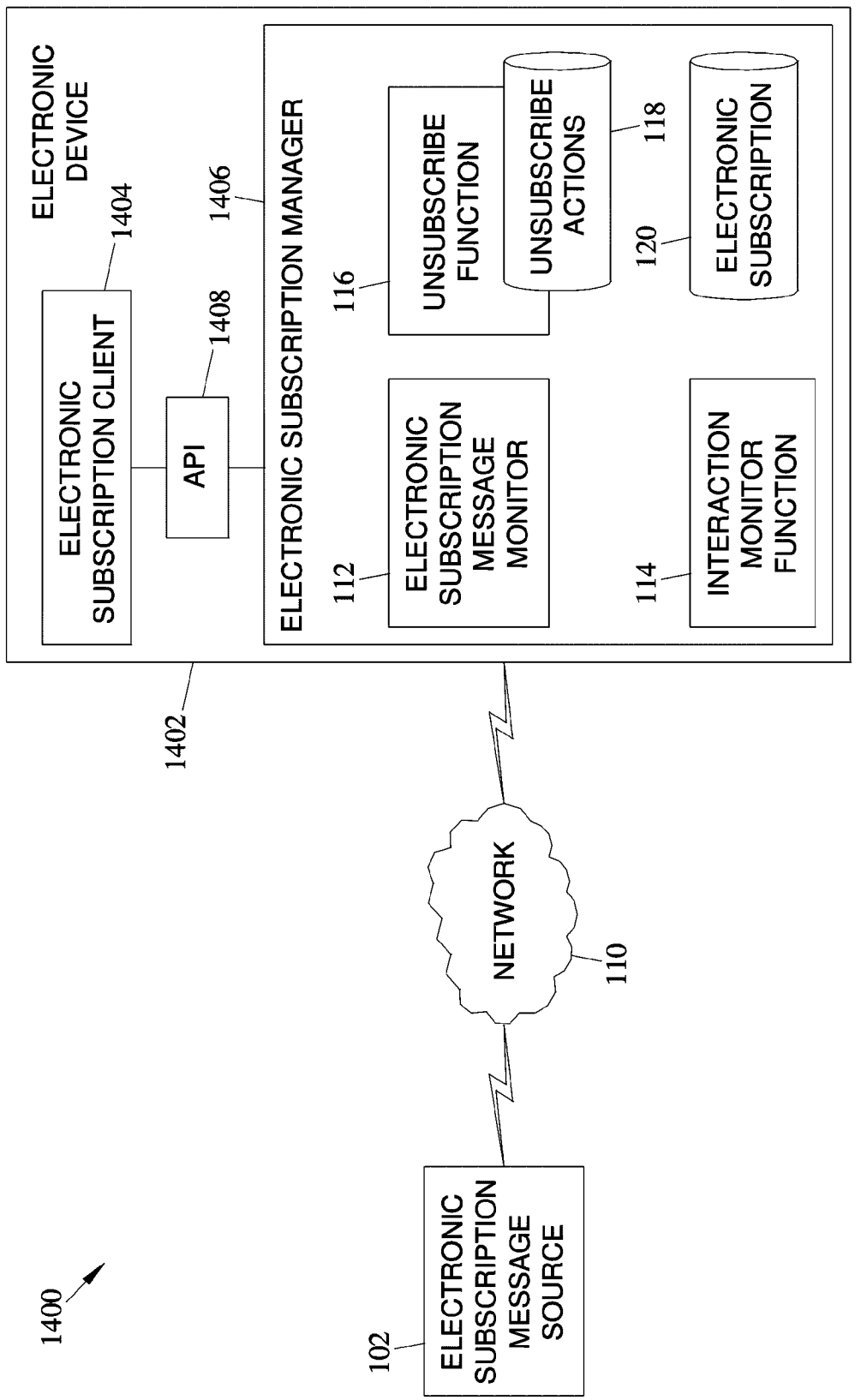
FIG. 14 is a block diagram of an exemplary system for managing electronic subscriptions according to the subject matter described herein.

In one embodiment, an electronic subscription client may be separate from an electronic subscription message monitor, an interaction monitor function, an unsubscribe function, and an electronic subscription database. The electronic subscription message monitor, the interaction monitor function, the unsubscribe function, and the electronic subscription database may be contained within an electronic subscription manager. The separation of the electronic subscription client may be advantageous, for example, for providing the services of the electronic subscription manager to a plurality of electronic subscription clients on a single electronic device. Another exemplary advantage is that the electronic subscription manager may be deployed on a standard operating system. FIG. 14 is a block diagram of an exemplary system 1400 for managing electronic subscriptions according to the subject matter described herein. System 1400 includes an electronic device 1402 including an electronic subscription client 1404 that is separate from an electronic subscription manager 1406. Electronic subscription manager 1406 may include electronic subscription message monitor 112, interaction monitor function 114, unsubscribe function 116, unsubscribe actions database 118, and electronic subscription database 120, each of which may include functionality as described herein. The same communications as described herein may occur between electronic subscription client 1404 and the components of subscription manager 1406. An application program interface (API) may manage interoperability between electronic subscription client 1404 and electronic subscription manager 1406.

Figure 15:
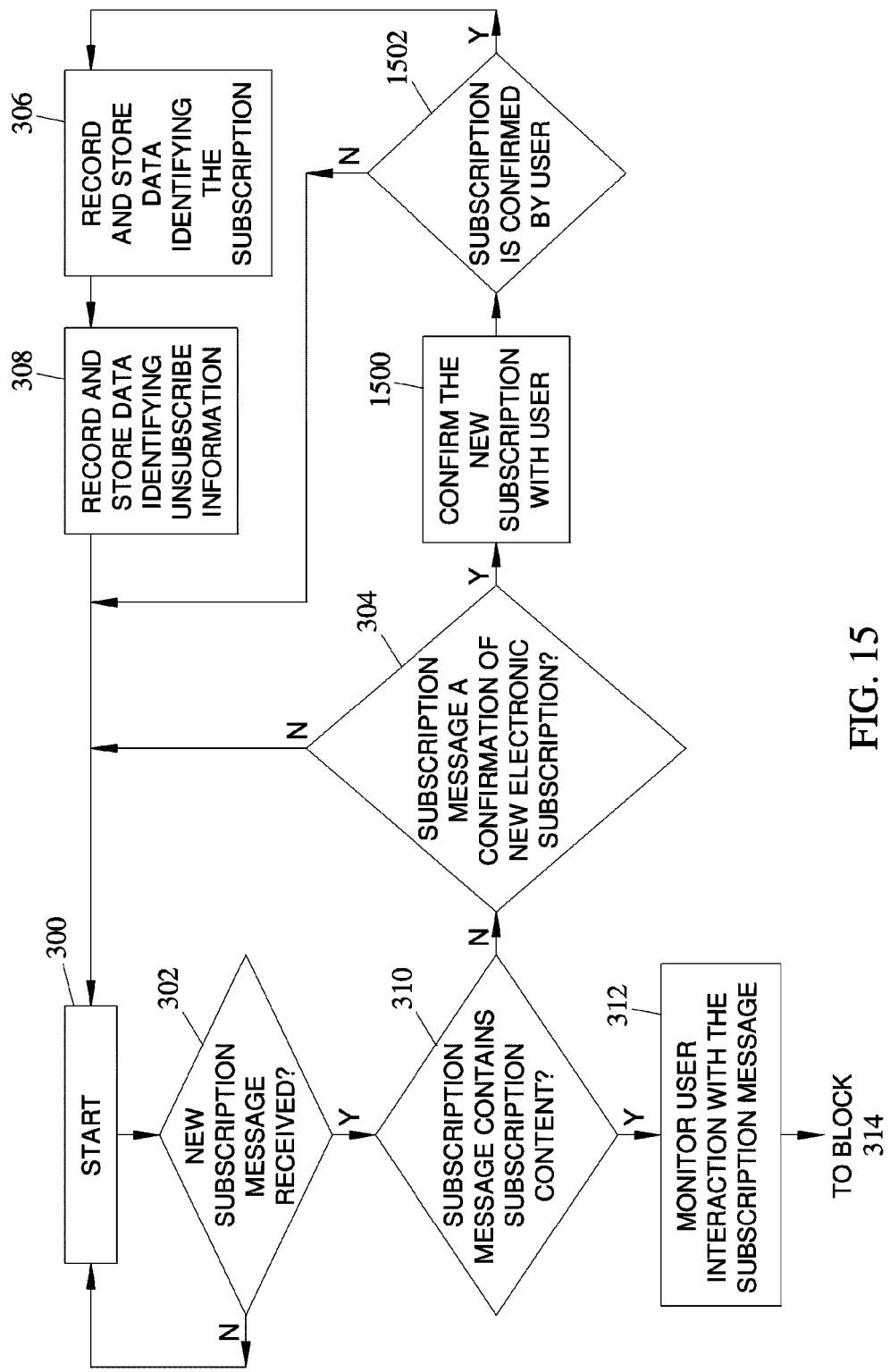
FIG. 15 is a flow chart illustrating an exemplary process for use by the system shown in FIG. 1 for confirmation by a user of a new electronic subscription according to an embodiment of the subject matter described herein.

In one embodiment, a user can be prompted to confirm that a subscription message is a confirmation of a new electronic subscription. FIG. 15 is a flow chart illustrating an exemplary process for use by system 100 shown in FIG. 1 for confirmation by a user of a new electronic subscription according to an embodiment of the subject matter described herein. The process of FIG. 15 includes blocks 300, 302, 304, 306, 308, and 310, 312 similar to the same blocks of FIGS. 3A and 3B. In this example, the process may proceed to process blocks similar to those shown in FIG. 3A after implementing the process at block 312.

The FIG. 15 process includes blocks 1500 and 1502. In block 304, if electronic subscription message monitor 112 determines that a subscription message is a confirmation of a new electronic subscription, the new electronic subscription may be confirmed with the user (block 1400). For example, a prompt may be presented to the user for confirming the new electronic subscription.

In block 1502, electronic subscription message monitor 112 may determine whether the user confirms the new electronic subscription. For example, monitor 112 may detect input by the user for confirming the new electronic subscription. If it is determined that the user confirms the new electronic subscription, the process may proceed to block 306. Otherwise, if is determined that the user does not confirm the new electronic subscription, the process may proceed to block 300. Thus, block 1500 and 1502 provided for the confirmation of a new electronic subscription by a user.

In one embodiment, a user may identify a confirmation subscription message or subscription message content for an electronic subscription message monitor. In one example, a user may use a mouse for right clicking on an e-mail message. In response to the right click, a menu may be presented on a display including an item that may be selected for identifying the subscription message as being associated with an electronic subscription. Alternatively, a menu item may be selected for identifying a message as confirmation of an electronic subscription. Further, a user may identify content in a message for identifying the message as being associated with an electronic subscription. The identified content may be a keyword or text. The electronic subscription message monitor may be configured for recognizing the identified keyword or text for use in identifying other subscription messages associated with the electronic subscription.

Figure 16:
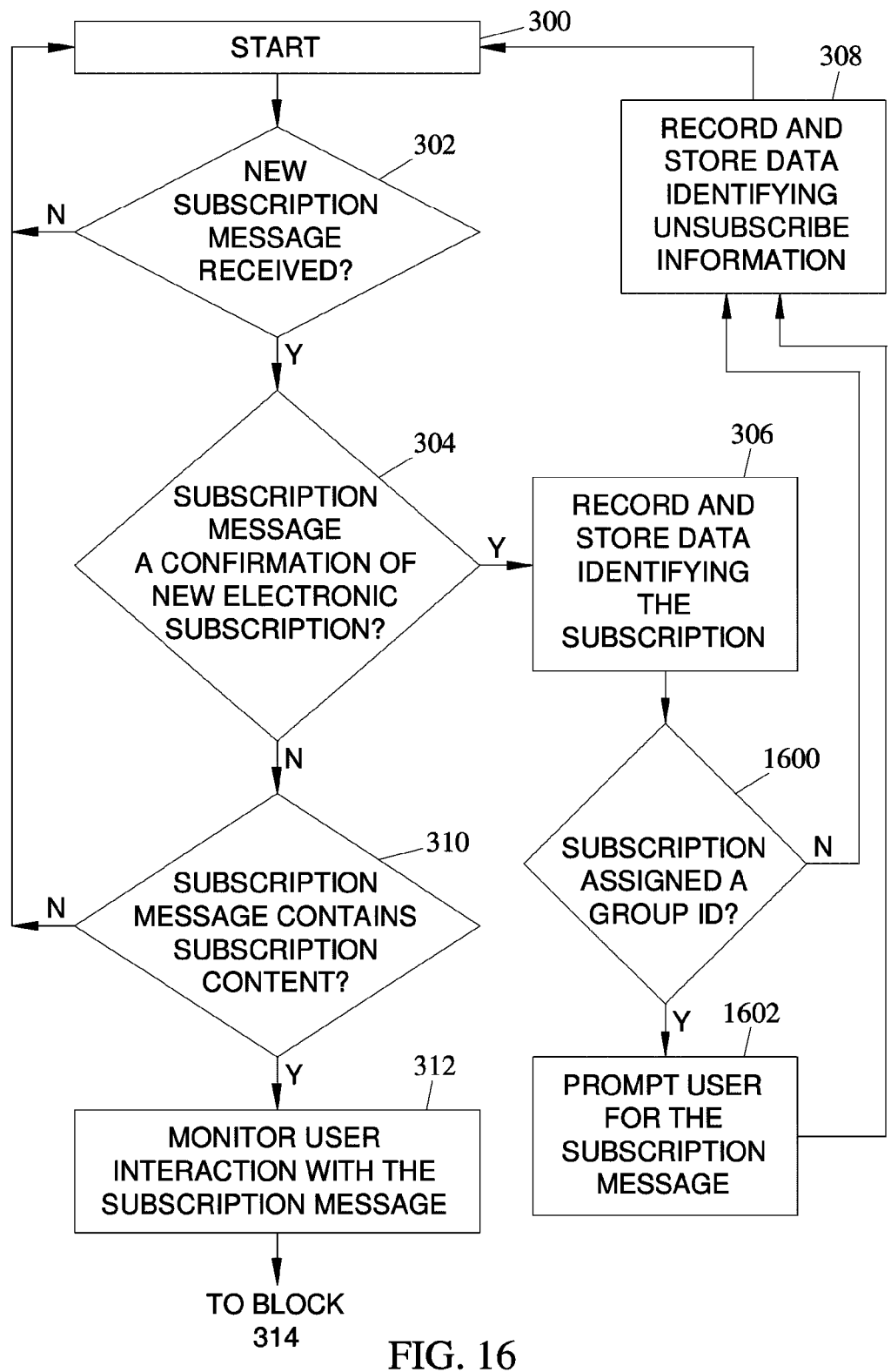
FIG. 16 is a flow chart illustrating an exemplary process for use by the system shown in FIG. 4 for grouping subscription messages to determine redundancy according to an embodiment of the subject matter described herein.

In one embodiment, only grouped subscription messages may be compared to one another for determining redundancy. A user may configure a subscription message redundancy monitor to select only subscription messages meeting user defined criteria for a redundancy determination. In one example, subscription messages may be grouped together according to a group identifier. Exemplary group identifiers include information technology (IT) security, sports, and news FIG. 16 is a flow chart illustrating an exemplary process for use by system 400 shown in FIG. 4 for grouping subscription messages to determine redundancy according to an embodiment of the subject matter described herein. The process of FIG. 16 includes blocks 300, 302, 304, 306, 308, and 310, 312 similar to the same blocks of FIGS. 3A and 3B. In this example, the process may proceed to process block similar to those shown in FIG. 3B after implementing the process at block 312.

The FIG. 16 process also includes blocks 1600 and 1602. In block 1600, electronic subscription message monitor 112 may determine whether the new subscription message should be assigned a group identifier. In one example, a user may configure monitor 112 to provide a prompt for the user to input a group identifier for new subscription messages. Further, in one example, monitor 112 may be configured to determine whether the new subscription message includes a group identifier defined by the user. If it is determined that the new subscription message should be assigned a group identifier, monitor 112 may prompt the user for a group identifier for the new subscription message. In one example, the user may input a group identifier for the new subscription message after examining the message. The group identifier may be stored in electronic subscription database 120. Subscription messages may only be compared to other subscription messages in the same group for the purpose of determining redundancy.

A record in an electronic subscription database may include a group identifier for grouping subscription messages for redundancy determinations. Table 5 below shows exemplary records of an electronic subscription database according to the subject matter described herein.

TABLE 5

Electronic Subscription Database

| Subscription Name | Group ID | Source | Subscription Status | Unique Identifier | Date Initialized | MR | MAU | Viewing Frequency |
|---|---|---|---|---|---|---|---|---|
| Microsoft Security Newsletter | 2 | ms-secnews@security.focus.com | Active | MS Security Newsletter | May 23, 2006 | 1 | 0 | N/A |
| Linux Security Newsletter | 2 | linux-secnews@securityfocus.com | Active | Linux Security Newsletter | Aug. 02, 2004 | 50 | 45 | 90% |
| ESPN | 1 | espnnews@espn.com | Active | ESPN news | Dec. 22, 2005 | 23 | 23 | 100% |

In Table 5, the ESPN® sports news subscription is the only member of group identifier 1. Subscription messages from the ESPN subscription may be associated with group identifier 1 by including the phrase "ESPN news". Further, the Microsoft Security Newsletter and Linux Security Newsletter subscriptions are grouped together by group identifier 2. Subscription messages from the MICROSOFT® Security Newsletter and Linux Security Newsletter subscriptions may be associated with group identifier 2 by including the phrases "MS Security Newsletter" and "Linux Security Newsletter," respectively.

Figure 17:
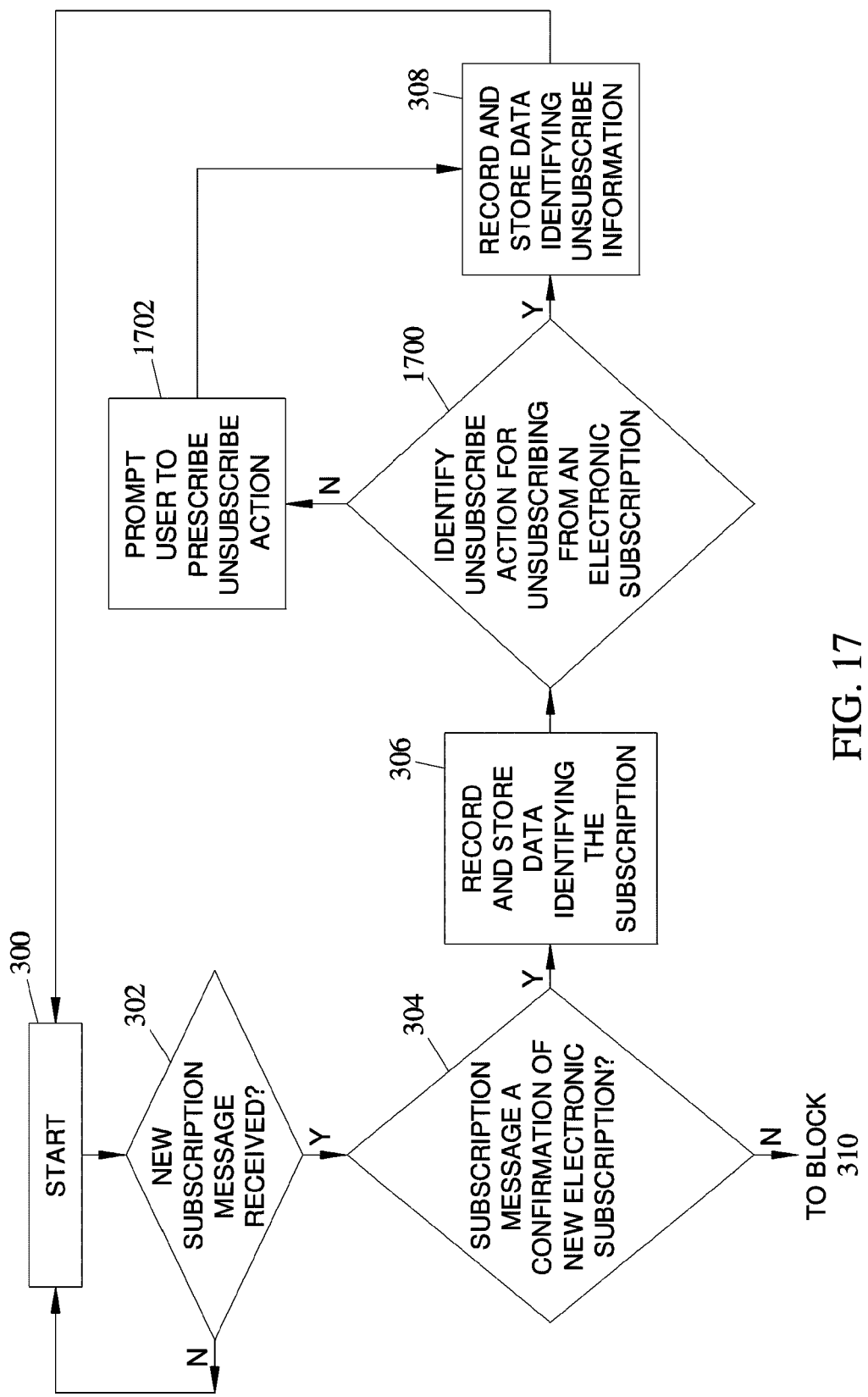
FIG. 17 is a flow chart illustrating an exemplary process for use by the system shown in FIG. 1 for prompting a user to prescribe an unsubscribe action according to an embodiment of the subject matter described herein.

In one embodiment, an unsubscribe function may prompt a user to prescribe an unsubscribe action. The user may be prompted if the unsubscribe function cannot determine an unsubscribe action autonomously. FIG. 17 is a flow chart illustrating an exemplary process for use by system 100 shown in FIG. 1 for prompting a user to prescribe an unsubscribe action according to an embodiment of the subject matter described herein. Referring to block 1700, unsubscribe function 116 may determine whether it can identify an unsubscribe action for unsubscribing from an electronic subscription. If unsubscribe function 116 can identify an unsubscribe action, the process may proceed to block 308. Otherwise, if unsubscribe function 116 cannot identify an unsubscribe action, unsubscribe function 116 may prompt the user to prescribe an unsubscribe action (block 1702). In response to the prompt, the user may enter an unsubscribe action. Unsubscribe function 116 may store the unsubscribe action in unsubscribe actions database 118 and associate it with the electronic subscription.

Figure 18:
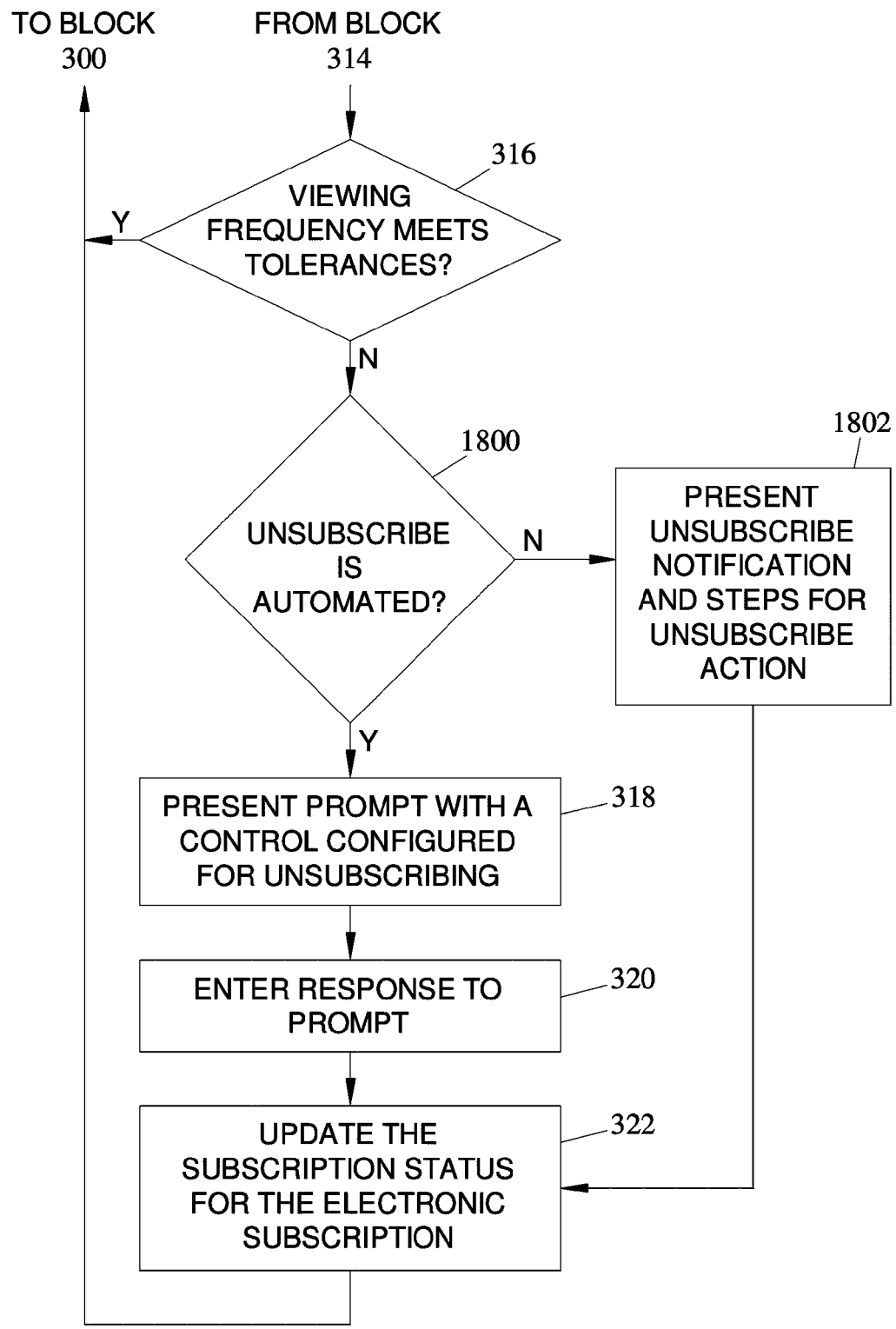
FIG. 18 is a flow chart illustrating an exemplary process for use by the system shown in FIG. 1 for presenting unsubscribe action steps to a user according to an embodiment of the subject matter described herein.

In one embodiment, an unsubscribe function may present unsubscribe notification and steps for an unsubscribe action if unsubscribe actions cannot be generated by the unsubscribe function or a user, or unsubscribe actions are not stored. The user may manually implement the presented unsubscribe actions for unsubscribing to an electronic subscription. FIG. 18 is a flow chart illustrating an exemplary process for use by system 100 shown in FIG. 1 for presenting unsubscribe action steps to a user according to an embodiment of the subject matter described herein. Referring to block 1800, unsubscribe function 116 may determine whether unsubscribe is automated. If it is determined that unsubscribe is not automated, the process may proceed to block 318. Otherwise, if it is determined that unsubscribe is not automated, unsubscribe function 116 may present unsubscribe notification and steps for an unsubscribe action (block 1802). The user may implement the unsubscribe action steps for unsubscribing from the electronic subscription.

Figure 19:
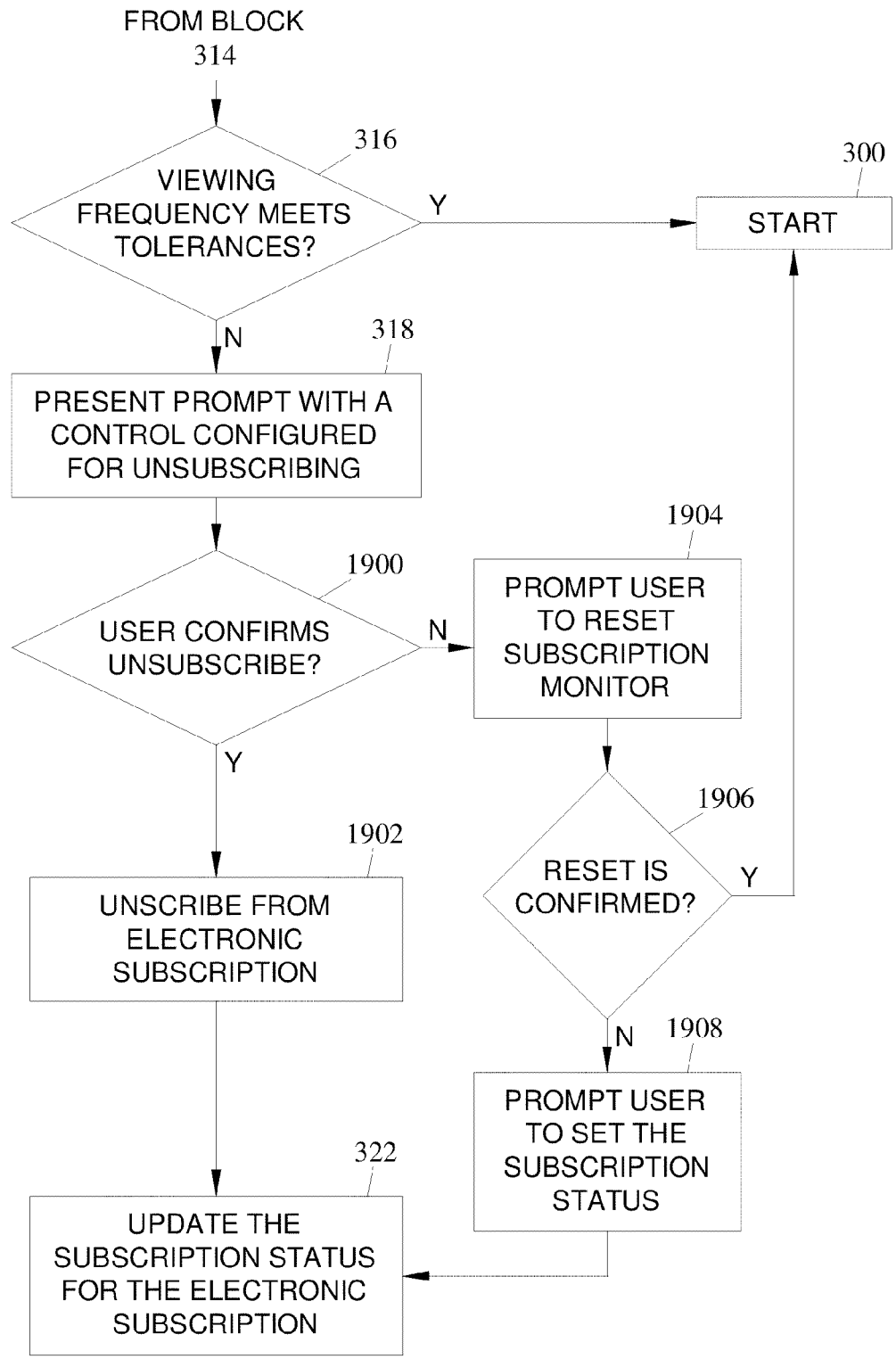
FIG. 19 is a flow chart illustrating an exemplary process for use by the system shown in FIG. 1 for confirming unsubscribing to an electronic subscription and for resetting monitoring of the electronic subscription according to an embodiment of the subject matter described herein.

In one embodiment, an unsubscribe function may provide for a user to confirm unsubscribe and to reset monitoring. FIG. 19 is a flow chart illustrating an exemplary process for use by system 100 shown in FIG. 1 for confirming unsubscribing to an electronic subscription and for resetting monitoring of the electronic subscription according to an embodiment of the subject matter described herein. Referring to block 1900, unsubscribe function 116 may receive user input for confirming an unsubscribe action for an electronic subscription. If the user input is to unsubscribe, unsubscribe function 116 may implement unsubscribe actions for unsubscribing from the electronic subscription (block 1902). If the user input is not to unsubscribe, unsubscribe function 116 may prompt a user about whether to reset subscription monitoring (block 1904). If it is determined that reset is confirmed (block 1906), the process may proceed to block 300. Otherwise, if it is determined that reset is not confirmed, the user may be prompted to set the subscribe status (block 1908). Unsubscribe function 116 may receive the subscribe status indicated by user input and set the subscribe status for the electronic subscription. Next, the process may proceed to block 322.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing electronic subscriptions, the method comprising:
    receiving user input for modifying an electronic subscription of a user to prevent receiving a redundant subscription message for the electronic subscription;
    determining whether a future subscription message is redundant based on at least one of an identifier for the subscription message and content included in the subscription message; and
    excluding from presentation to the user the future subscription message associated with the electronic subscription based on the redundancy determination and the user input,
    wherein determining whether the received subscription message is redundant includes determining redundancy based on at least one of an identifier for the subscription message and content included in the subscription message and at least one of an identifier and content included in one or more messages associated with another electronic subscription.

2. The method of claim 1 comprising monitoring receipt of one or more subscription messages at an electronic subscription client including one of an e-mail client, a real simple syndication (RSS)-based client, a media-based client, a photoshare client, and a personalized web page subscription client.

3. The method of claim 1 wherein determining whether the received subscription message is redundant includes identifying the redundancy with another electronic subscription received within a predetermined time period of receipt of the subscription message.

4. The method of claim 1 wherein determining whether the received subscription message is redundant includes determining whether the received subscription message and one or more previously-received subscription messages have a threshold amount of common content.

5. The method of claim 1 wherein receiving user input for modifying an electronic subscription of a user includes presenting a user with a control configured for preventing receiving a future subscription message associated with one of the electronic subscriptions for which the subscription message was received and the other electronic subscription.

6. The method of claim 1 wherein determining whether the received subscription message is redundant includes determining whether one or more links, addresses, or URIs in the subscription message matches one or more links, addresses, or URIs in another message.

7. The method of claim 1 wherein modifying the electronic subscription includes unsubscribing the user from receiving the future subscription message associated with the electronic subscription.

8. A system for managing electronic subscriptions, the system comprising:
    a memory;
    a subscription function configured to receive user input for modifying an electronic subscription of a user to prevent receiving a redundant subscription message for the electronic subscription and to exclude from presentation to the user the future subscription message associated with the electronic subscription based on a redundancy determination and the user input; and
    a subscription message redundancy monitor configured to perform the redundancy determination by determining whether a future subscription message is redundant based on at least one of an identifier for the subscription message and content included in the subscription message,
    wherein the subscription message redundancy monitor is configured to determine redundancy based on at least one of an identifier for the subscription message and content included in the subscription message and at least one of an identifier and content included in one or more messages associated with another electronic subscription.

9. The system of claim 8 comprising an electronic subscription message monitor configured to monitor receipt of one or more subscription messages at an electronic subscription client including one of an e-mail client, a real simple syndication (RSS)-based client, a media-based client, a photoshare client, and a personalized web page subscription client.

10. The system of claim 8 wherein the subscription message redundancy monitor is configured to identify the redundancy with another electronic subscription received within a predetermined time period of receipt of the subscription message.

11. The system of claim 8 wherein the subscription message redundancy monitor is configured to determine whether the received subscription message and one or more previously-received subscription messages have a threshold amount of common content.

12. The system of claim 8 wherein the unsubscribe function is configured to present a user with a control configured for preventing receiving a future subscription message associated with one of the electronic subscriptions for which the subscription message was received and the other electronic subscription.

13. The system of claim 8 wherein the subscription message redundancy monitor is configured to determine whether one or more links, addresses, or URIs in the subscription message matches one or more links, addresses, or URIs in another message.

14. The system of claim 8 wherein the subscription function is configured to unsubscribe the user from receiving the future subscription message associated with the electronic subscription.

15. A computer program product comprising computer executable instructions embodied in a non-signal computer readable medium for performing steps comprising:
  receiving user input for modifying an electronic subscription of a user to prevent receiving a redundant subscription message for the electronic subscription;
  determining whether a future subscription message is redundant based on at least one of an identifier for the subscription message and content included in the subscription message; and
  excluding from presentation to the user the future subscription message associated with the electronic subscription based on the redundancy determination and the user input,
  wherein determining whether the received subscription message is redundant includes determining redundancy based on at least one of an identifier for the subscription message and content included in the subscription message and at least one of an identifier and content included in one or more messages associated with another electronic subscription.

* * * * *